United States Patent
Yip et al.

(10) Patent No.: US 7,342,748 B2
(45) Date of Patent: Mar. 11, 2008

(54) SYSTEM WITH MATRIX ARRAY OF WRITE HEADS AND MATRIX ARRAY OF MAGNETORESISTIVE (MR) READ HEADS

(75) Inventors: Yung Yip, Afton, MN (US); James S. Anderson, Hugo, MN (US); Douglas W. Johnson, Stillwater, MN (US); Denis J. Langlois, River Falls, WI (US); Richard W. Molstad, St. Paul, MN (US)

(73) Assignee: Imation Corp., Oakdale, MN (US)

( * ) Notice: Subject to any disclaimer, the term of this patent is extended or adjusted under 35 U.S.C. 154(b) by 412 days.

(21) Appl. No.: 11/013,279

(22) Filed: Dec. 14, 2004

(65) Prior Publication Data

US 2005/0152067 A1 Jul. 14, 2005

Related U.S. Application Data

(63) Continuation-in-part of application No. 10/755,143, filed on Jan. 8, 2004.

(51) Int. Cl.
G11B 5/48 (2006.01)
G11B 21/16 (2006.01)
G11B 5/56 (2006.01)
G11B 21/24 (2006.01)
G11B 5/33 (2006.01)
G11B 5/127 (2006.01)

(52) U.S. Cl. ............. 360/241.1; 360/291; 360/251.1; 360/314; 360/315

(58) Field of Classification Search ............ 360/241.1, 360/291, 251.1, 241.2, 314, 315, 316
See application file for complete search history.

(56) References Cited

U.S. PATENT DOCUMENTS

| | | | |
|---|---|---|---|
| 5,124,869 A | | 6/1992 | Lehureau |
| 5,883,760 A | * | 3/1999 | Yamada et al. ............... 360/76 |
| 5,917,671 A | * | 6/1999 | Kaaden et al. ........... 360/77.12 |
| 5,982,591 A | | 11/1999 | Folkerts et al. |
| 6,650,496 B2 | * | 11/2003 | Nozieres et al. .............. 360/63 |
| 6,778,361 B2 | * | 8/2004 | Magnusson .............. 360/241.1 |
| 6,970,325 B2 | | 11/2005 | Ozue |
| 7,142,388 B2 | * | 11/2006 | Tateishi et al. .......... 360/77.12 |
| 2002/0012192 A1 | * | 1/2002 | Kuiper et al. ............ 360/77.12 |
| 2004/0021982 A1 | * | 2/2004 | Ozue et al. ................. 360/121 |
| 2005/0007700 A1 | * | 1/2005 | Nagai ...................... 360/241.1 |
| 2005/0013042 A1 | | 1/2005 | Rubas et al. |
| 2005/0099715 A1 | * | 5/2005 | Yip et al. ..................... 360/48 |

(Continued)

Primary Examiner—William J Klimowicz
Assistant Examiner—Adam B Dravininkas
(74) Attorney, Agent, or Firm—Eric D. Levinson

(57) ABSTRACT

The invention provides a system comprising a non-linear array of magnetoresistive (MR) heads arranged in a two-dimensional matrix for reading information stored on magnetic media. The non-linear array of MR heads may comprise a planar array formed by a plurality of linear arrays of MR heads stacked to define a plurality of layers. Each of the linear arrays may share at least one shield element with another linear array of the non-linear array. In general, each layer is offset by one written track pitch and the number of layers of the invention is equal to the number of written track pitches in a channel pitch. The invention can also be used in a system for reading and writing information to magnetic media at improved track pitches relative to conventional read/write systems.

13 Claims, 17 Drawing Sheets

U.S. PATENT DOCUMENTS

2005/0259358 A1   11/2005 Ozue
2006/0028772 A1    2/2006 Raastad
2006/0039082 A1*   2/2006 Biskeborn et al. .......... 360/129

* cited by examiner

US 7,342,748 B2

SYSTEM WITH MATRIX ARRAY OF WRITE HEADS AND MATRIX ARRAY OF MAGNETORESISTIVE (MR) READ HEADS

CROSS-REFERENCE TO RELATED APPLICATIONS

This application is a continuation-in-part of U.S. application Ser. No. 10/755,143 filed Jan. 8, 2004, for Yip, entitled System with Matrix Array of Write Heads and Array of Magnetoresistive (MR) Read Heads; said application Ser. No. 10/755,143 is incorporated herein by reference in its entirety.

TECHNICAL FIELD

The invention relates to magnetic data storage media and, more particularly, to magnetic heads for reading and writing data to such media.

BACKGROUND

Magnetic data storage media are commonly used for storage and retrieval of data, and come in many forms, such as magnetic tape, magnetic disks, and the like. Magnetic tape media remains an economical medium for storing large amounts of data. For example, magnetic tape cartridges, or large spools of magnetic tape are often used to back up large amounts of data for large computing centers. Magnetic tape cartridges also find application in the backup of data stored on smaller computers such as workstations, desktop or laptop computers.

In magnetic tape, data is typically stored as magnetic signals that are magnetically recorded on the medium surface. The data stored on the magnetic tape is often organized along data tracks, and read/write heads are positioned relative to the data tracks to write data to the tracks or read data from the tracks. As the number of data tracks increases, the data storage capacity of the magnetic tape likewise increases. However, as the number of data tracks increases, the tracks usually become narrower and more crowded on the surface of the data storage tape. Servo tracks are also commonly defined on magnetic media to provide reference points for tracking the location of data tracks.

A wide variety of heads have been designed to write data to magnetic media. Various heads have also been designed to read data stored on magnetic media. A magnetic data storage system often includes both write heads and read heads to facilitate the writing of information to the magnetic medium and readout of such information.

SUMMARY

In general, the invention provides a system for reading information stored on magnetic media. The system utilizes a non-linear array of magnetoresistive (MR) heads arranged in a two-dimensional matrix. Each of the MR heads of the non-linear array defines a read channel for the system. The non-linear array of MR heads may comprise a planar array of MR heads formed by a plurality of linear arrays of MR heads stacked to define a plurality of layers of the non-linear array. Each of the linear arrays of MR heads that defines a layer of the non-linear may share at least one shield element with another linear array of the non-linear array. In other words, a plurality of linear arrays of MR heads can be stacked to form a sandwich construction with each layer of the sandwich comprising a linear array of MR heads and adjacent layers sharing at least one shield element with another layer. Adjacent read channels can be defined in different layers in order to facilitate read channels that are separated by less than 20 microns or less than 10 microns.

The invention can also be used in a system for reading and writing information to magnetic media that utilizes an array of write heads arranged in a two-dimensional matrix and an array of MR heads arranged in a two-dimensional matrix. In that case, each of the write heads is substantially aligned with a corresponding one of the read heads such that each of the write channels substantially aligns with a corresponding read channel. Distinct data signals can be written to tracks on a medium using channels of the two-dimensional matrix array of write heads, and can be read using respective channels of the two-dimensional matrix of MR heads.

In one embodiment, the invention provides a system for reading information stored on magnetic media. The system comprises a non-linear array of MR heads arranged in a two-dimensional matrix, wherein each of the MR heads defines a read channel for the system.

In another embodiment, the invention provides a system for reading and writing information to magnetic media. The system comprises an array of write heads arranged in a two-dimensional matrix, wherein each of the write heads defines a write channel for the system, and an array of MR heads arranged in a two-dimensional matrix, wherein each of the MR heads defines a read channel for the system.

In another embodiment, the invention provides a system for reading and writing information to magnetic tape. The system comprises a first array of write heads, a first array of MR heads, a first actuator, a second array of write heads, a second array of MR heads, and a second actuator. The first array of write heads is arranged in a two-dimensional matrix, wherein each of the write heads in the first array of write heads defines a write channel for the system in a first tape direction. The first array of MR heads is arranged in a two-dimensional matrix, wherein each of the MR heads in the first array of MR heads defines a read channel for the system in a second tape direction. The first actuator is coupled to the first array of write heads and the first array of MR heads to collectively move the first array of write heads with the first array of MR heads. The second array of write heads is arranged in a two-dimensional matrix, wherein each of the write heads in the second array of write heads defines a write channel for the system in the second tape direction. The second array of MR heads is arranged in a two-dimensional matrix, wherein each of the MR heads defines a read channel for the system in the first tape direction. The second actuator is coupled to the second array of write heads and the second array of MR heads to collectively move the second array of write heads with the second array of MR heads.

The first array of write heads may be used simultaneously with the second array of MR heads, e.g., in the first tape direction. Similarly, the second array of write heads may be used simultaneously with the first array of MR heads, e.g., in the second tape direction. Accordingly, the first and second actuators can allow for independent positioning of the array of write heads and the array of read heads, regardless of tape motion. This can also simplify fabrication of the system by avoiding alignment concerns between the different arrays mounted on a common mounting structure. The actuators can ensure proper alignment and can be independently controlled via feedback of servo positioning signal readout by each respective array.

The invention may be capable of providing one or more advantages. For example, the invention incorporates a planar array of MR heads with a planar array of write heads to facilitate a system that can operate at improved track pitches relative to conventional read/write system. In particular, track pitches less than 100 microns, less than 50 microns, or even less than 10 microns can be achieved. Accordingly, the invention can facilitate increased storage densities on magnetic media, and is particularly useful for increasing the storage densities of magnetic tape. A planar array of MR heads formed by a plurality of linear arrays of MR heads stacked to define a plurality of layers may have advantages in terms of quality of readout and ease of manufacture, relative to magneto-optical read heads or other read heads.

Moreover, in some embodiments, the invention provides systems and techniques that allow for bi-directional read/write operations to be executed on magnetic tape. In particular, write operations can be performed simultaneously on multiple magnetic tape tracks, at track pitches less than 100 microns, less than 50 microns, or even less than 10 microns. Then, read operations can be performed simultaneously on the multiple magnetic tape tracks, e.g., to verify the integrity of the information written to the multiple tape tracks. Moreover, in some embodiments, first and second actuators can allow for independent positioning of the array of write heads and the array of read heads, regardless of tape motion. As mentioned above, in that case, the system can be improved because alignment of the array of write heads with the array of read heads can be performed independently by the different actuators.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
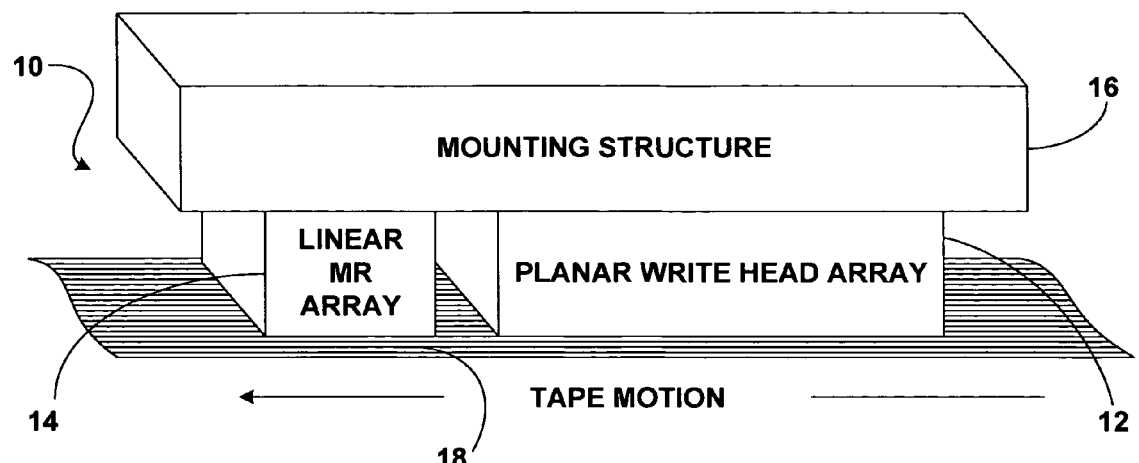
FIG. 1 is a perspective view of a system comprising a linear array of magnetoresistive (MR) heads and a planar array of write heads according to an embodiment of the invention.

The invention provides a system comprising a non-linear array of magnetoresistive (MR) heads arranged in a two-dimensional matrix. Each of the MR heads of the two-dimensional matrix defines a read channel for the system. The non-linear array of MR heads may comprise a planar array formed by a plurality of linear arrays of MR heads stacked to define a plurality of layers of the non-linear array. Each of the linear arrays of MR heads that define layers of the non-linear array may share at least one shield element with another linear array of the non-linear array. In other words, a plurality of linear arrays of MR heads can be stacked to form a sandwich construction with each layer of the sandwich comprising a linear array of MR heads and adjacent layers sharing at least one shield element with another layer. Adjacent read channels can be defined in different layers in order to facilitate read channels that are separated by less than 20 microns or less than 10 microns.

The invention can also be used in a system for reading and writing information to magnetic media that utilizes an array of write heads arranged in a two-dimensional matrix and an array of MR heads arranged in a two-dimensional matrix. In that case, each of the write heads is substantially aligned with a corresponding one of the read heads such that each of the write channels substantially aligns with a corresponding read channel. Distinct data signals can be written to tracks on a medium using channels of the two-dimensional matrix array of write heads, and can be read using respective channels of the non-linear array of MR heads. In some cases, however, the array of read heads may include additional read heads that do not necessarily align with a write heads, which may be used, e.g., for servo tracking.

As described in greater detail below, the invention includes features that can operate at improved track pitches relative to conventional read/write systems. Accordingly, the invention can facilitate increased storage densities on magnetic media, and is particularly useful for increasing the storage densities of magnetic tape. In particular, track pitches less than 20 microns or even less than 10 microns can be achieved. Additionally, the invention may have advantages in terms of quality and ease of manufacture, relative to magneto-optical read heads or other read heads.

Moreover, material mismatch between magnetic tape and read/write heads can lead to misalignment between tracks and read/write heads due to differences in thermal and hydroscopic expansion coefficients. The non-linear arrangement of MR heads in a two-dimensional matrix addresses these problems by facilitating reduced track pitches. Track/head misalignment problems are reduced because dimensional changes to the medium are averaged across the distance spanned by the number of head channel pitches. In a two-dimensional matrix arrangement, the MR head channel pitch is greatly reduced, hence the distance spanned by the head channels is also reduced. Therefore, the system described herein can facilitate read and write operations at very small track pitches.

FIG. 1 is perspective view of a system 10 comprising a linear array of magnetoresistive (MR) heads 14 and a planar array of write heads 12. In the FIGS., individual magnetoresistive heads are abbreviated (MR) and individual write heads are abbreviated (WH). Linear array of MR heads 14 and planar array of write heads 12 may be precisely mounted into a mounting structure 16 in order to ensure that the channels of linear array 14 align with the channels of planar array. For example, microscopes or optical alignment techniques may be used in order to ensure channel alignment between arrays 12 and 14. Alternatively, separate mounting structures or actuators may be used for array 12 and array 14. In that case, servo tracking could be performed independently for each array.

Magnetic tape 18 can feed past planar array 12 of write heads and data can be written to different tracks of magnetic tape 18 via the different write heads of planar array 12. Each write head defines a channel of planar array 12, with each channel corresponding to a unique track on magnetic tape 18. Each MR head in the linear array 14 also defines a channel. Each channel defined by a write head and a corresponding MR head align with a track on magnetic tape 18. Thus, each track on magnetic tape 18 can be written by a unique write head of planar array 12 and read by a unique MR head of linear array 14. One or more of the write heads of planar array 12 may also function as an inductive read element used for reading and tracking pre-written servo marks.

The tracks of magnetic tape 18 may be data tracks or servo tracks. Accordingly, the channels of planar array 12 may be used to record data or servo information, depending on the implementation of system 10. Linear array of MR heads 14 can simultaneously read information stored in the different tracks of magnetic tape 18. Magnetic tape 18 can feed past linear array of MR heads 14 and data can be read from the different tracks of magnetic tape 18 via the different MR heads of linear array 14. Like the channels of planar array 12, the channels of linear array 14 may be used to read data or servo information. In some cases, linear array 14 can be used independently of planar array 12, e.g., during readout of pre-recorded data. In other cases, linear array 14 may be used to read and verify information as it is recorded by planar array 12.

Figure 2:
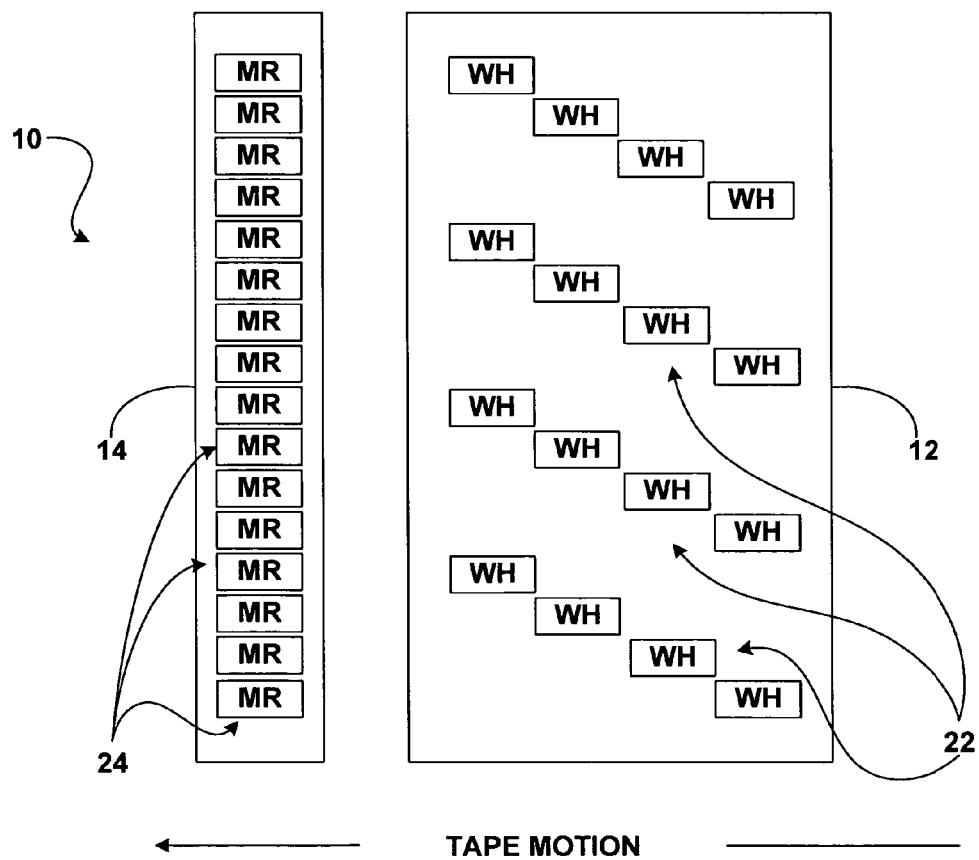
FIG. 2 is a bottom view of the system illustrated in FIG. 1.

FIG. 2 is a bottom view of system 10 illustrating planar array 12 of write heads and linear array 14 of MR heads. In particular, planar array 12 comprises a set of write heads 22 arranged in a two-dimensional matrix, wherein each of the write heads defines a write channel for system 10. In other examples, however, a two-dimensional matrix of write heads could be non-planar.

Linear array 14 comprises a set of magnetoresistive (MR) heads 24 arranged in a linear configuration. Importantly, each of write heads 22 substantially align with a corresponding one of MR heads 24. Thus, system 10 may include a same number of write heads 22 and MR heads 24. Although sixteen MR heads 24 and sixteen write heads 22 are illustrated, system 10 may include any number of MR heads 24 and a corresponding number of write heads 22. In some cases, additional read heads may be provided for readout of servo positioning signals.

Conventionally, track pitch reduction in magnetic tape systems has been limited by difficulties in reducing the spacing between write heads in a linear array of write heads. In particular, the pitch of the excitation coil of write heads has generally resulted in track pitch limits in conventional magnetic writing devices. In order to address such track pitch limitations, the invention provides for a planar array 12 of write heads 22 arranged in a two-dimensional matrix. Accordingly, channel pitches of adjacent write heads 22 are not limited by the pitch of the excitation coils. In some cases, the excitation coil of write heads 22 can be coiled into a direction perpendicular to the plane of planar array 12 so as to further avoid conventional track pitch limitations. Moreover, an array of write heads with excitation coils perpendicular to the plane of the array can also be formed in an integrated circuit. In any case, planar array 12 is used with a linear array of MR heads 14. For example, linear array of MR heads 14 may comprise a conventional configuration of MR heads because the track pitch spacing concerns are not as prevalent for linear arrays of MR heads.

Another problem with track pitch reductions results from dimensional instability of flexible magnetic media. In particular, flexible magnetic media can pose substantial problems to track pitch reductions because changes to the media dimensions can cause changes between the locations of tracks before and after the tracks are written. The matrix arrangement of write heads described herein addresses these problems by avoiding limits imposed by head coils, and by including a large number of head channels so that the dimensional changes to the medium are allocated across a large number of tracks. Therefore, the system described herein can facilitate read and write operations at very small track pitches.

Each of write heads 22 substantially align with a corresponding one of MR heads 24. In this manner, each channel of system 10 includes a unique one of write heads 22 and a corresponding unique one of read heads 24. Each channel corresponds to a track on the medium to be recorded, e.g., a data track or servo track on magnetic tape. In accordance with the invention, the track pitch (and head channel pitch) can be made less than 100 microns, less than 50 microns, or even less than 10 microns. Although channel pitches on this order are generally achievable with a linear array of MR heads, channel pitches on this order are generally not achievable with a linear array of write heads that include excitation coils. To achieve such channel pitches for the write heats, a planar array is generally needed. For this reason, the invention incorporates a linear array of MR heads with a planar array of write heads to facilitate a read/write system that can operate at improved track pitches relative to conventional read/write systems.

Figure 3:
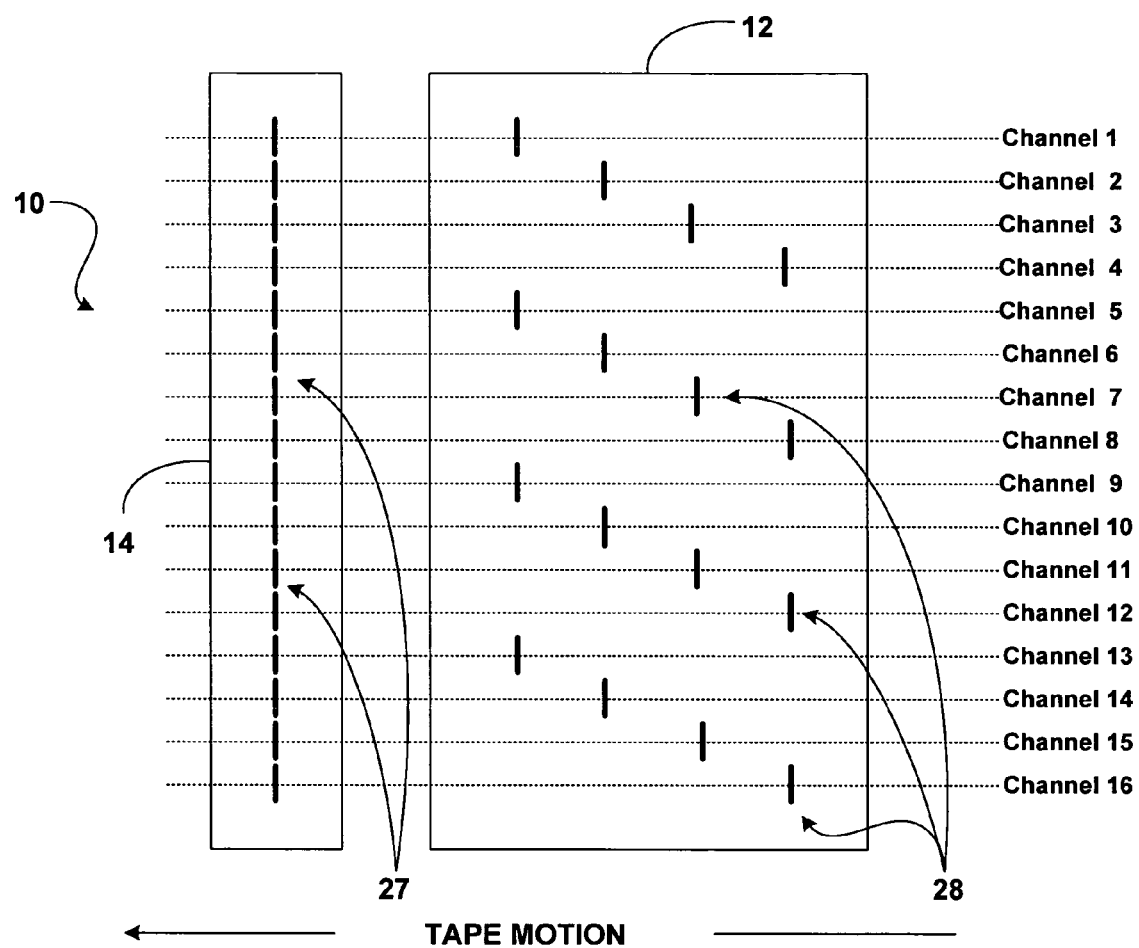
FIG. 3 is another bottom view rendition of the system illustrated in FIG. 1.

FIG. 3 is another bottom view rendition of system 10 comprising planar array 12 of write heads and linear array 14 of read heads. In the illustration of FIG. 3, planar array 12 comprises a set of write heads which are illustrated as write gaps arranged in a two-dimensional matrix. Again, each of the write heads (or write gaps) defines a write channel for system 10. Sixteen channels are labeled on FIG. 3.

Linear array 14 comprises a set of magnetoresistive (MR) heads which are illustrated in FIG. 3 as gaps 27 arranged in a linear configuration. Importantly, each of write heads 22 substantially align with a corresponding one of MR heads 24. Thus system 10 may include a same number of write heads 22 and MR heads 24. Each channel can be viewed as being defined by a corresponding head of linear array 14, a corresponding head of planar array 12, or both. As mentioned, however, in some cases, additional read heads may be provided for readout of servo positioning signals. In any case, the invention incorporates a linear array 14 of MR heads with a planar array 12 of write heads to facilitate a system that can operate at improved track pitches relative to conventional read/write systems. Again, such track pitches may be less than 100 microns, less than 50 microns, or even less than 10 microns. At such track pitches, data storage densities of magnetic media can be enhanced, particularly for magnetic tape.

By way of example, planar array 12 of write heads may comprise a fully integrated matrix magnetic recording head with independent control such as that substantially described in U.S. Patent Publication 2003/0011922, published Jan. 16, 2003 to Nozieres et al. U.S. Patent Publication 2003/0011922 is hereby incorporated herein by reference in its entirety. Other configurations of planar array 12, however, may also be used. In FIG. 3, the write heads are illustrated as gaps 28 arranged in a planar matrix configuration, although non-planar matrix configurations could also be used.

Linear array 14 of MR heads may comprise a set of MR heads or giant magnetoresistive (GMR) heads arranged in a linear configuration. Each MR head of linear array 12 may include an MR sensor material that is resistively responsive to magnetic fields. When the magnetic field proximate the MR sensor material changes, the MR head can detect such changes. In this manner, the MR heads utilize magnetic and resistive phenomena to facilitate detection of magnetically encoded in formation on a magnetic medium.

A linear array of MR heads may have advantages in terms of quality of readout and ease of manufacture, relative to magneto-optic read heads or other read heads. For this reason, the combination of a linear array of MR heads with a planar array of write heads can allow for read and write operations at improved track pitches relative to conventional systems, and also provide a read/write system at reduced costs relative to a system that uses magneto-optic heads for readout. MR heads may also have better reading sensitivity and improved signal-to-noise ratios relative to magneto-optic read heads or other types of read heads capable of operating at the small track pitches described herein. Accordingly, MR heads may be more reliable than magneto-optic heads or other read heads.

Figure 4:
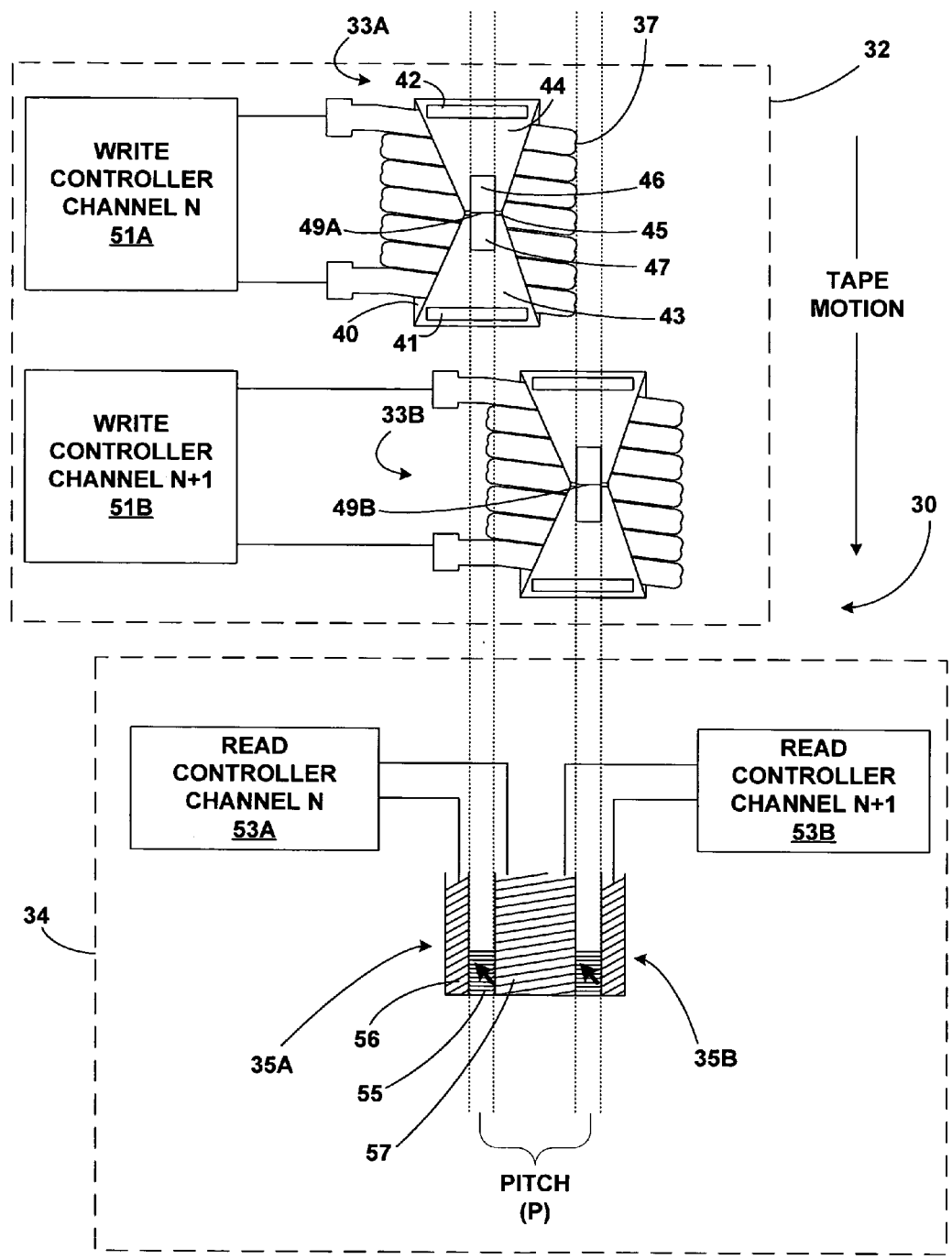
FIG. 4 is a block diagram illustrating a portion of a planar array of write heads and a portion of a linear array of MR heads according to an embodiment of the invention.

FIG. 4 is a block diagram of system 30 illustrating a portion of a planar array 32 of write heads and a portion of a linear array 34 of MR heads. In this case, only two channels of planar array 32 and a corresponding two channels of linear array 34 are illustrated. For example, a first channel is defined by first write head 33A and first MR head 35A, and a second channel is defined by second write head 33B and second MR head 35B.

Write heads 33A and 33B are substantially similar but separated by a distance of one head channel pitch (P). In particular, the write gaps 49A and 49B of write heads 33A and 33B are separated by the head channel pitch (P). Write heads 33 will be described with reference to head 33A. Again, however, write head 33B is substantially similar to write head 33A.

Write head 33A comprises a magnetic circuit fabricated onto a non-magnetic substrate. Write head 33A includes an excitation coil 37 that coils in a direction perpendicular to the plane defined by planar array 32. This can help reduce the size of the array and also facilitate the matrix configuration in an integrated circuit.

In particular, excitation coil 37 wraps around a bottom pole piece 40. Bottom pole piece 40, two pillars 41, 42 and two concentrators 43, 44 are made of a magnetic material such as NiFe or another soft magnetic material. Concentrators 43, 44 are interrupted so as to define a gap 45. On top of gap 45 are additional pole pieces 46, 47 formed of a high saturation magnetization material that can prevent detrimental saturation of the poles when data is being written. For example, pole pieces 46, 47 may comprise sputtered FeTaN/TaN multilayers or plated FeCoNi, FeCoCr or NiFe. Pole pieces 46, 47 define write gap 49A used for writing magnetic signals to the magnetic medium. Head 33A can be formed by thin film deposition and patterning techniques generally known in the art. Additional details of exemplary write heads 33 can be found in U.S. Patent Publication 2003/0011922 which is incorporated herein by reference in its entirety.

Write heads 33 are separately controllable via write controllers 51A and 51B. Accordingly, signals can be written to adjacent tracks on a magnetic medium using write heads 33. Importantly, the illustrated configuration of write heads 33 allows for head channel pitch, and thus track pitches that are less than 100 microns, less than 50 microns, and even less than 10 microns. Moreover, write heads 33 may also function as an inductive read element used for reading and tracking pre-written servo marks.

MR heads 35A and 35B may comprise any type of MR read heads, including giant magnetoresistive (GMR) heads. MR heads 35A and 35B may be arranged in a linear configuration. MR heads 35A and 35B are substantially similar but separated by a distance of one head channel pitch (P). MR heads 35 will be described with reference to head 35A.

MR head 35A includes a magnetoresistive sensor material 55 separated by conductive materials 56 and 57. Magnetoresistive sensor material 55 may comprise NiFe or any other material that exhibits properties in which the material resistance is responsive to magnetic fields. In other words, the resistance of sensor material 55 changes as a function of the magnetic field in close proximity to material 55. Thus, a track of magnetic tape can be passed under magnetoresistive sensor material 55 and magnetic changes in the track will affect the resistance of material 55. By way of example, conductive materials 56, 57 may comprise Au or any other suitably conductive material.

Read controller 53A provides either constant voltage or constant current across conductive materials 56 and 57. Read controller 53A then measures changes in voltage or current, e.g., according to Ohm's Law, in order to identify changes in the resistance of material 55. In this manner, magnetic changes recorded on a track of magnetic tape can be detected by MR head 35A.

MR heads 35A and 35B are separately controllable via read controllers 53A and 53B. Accordingly, signals can be read from adjacent tracks on a magnetic medium using MR heads 35. In any case, the illustrated configuration of MR heads 35, or variations thereof, allow for head channel pitch, and thus track pitches that are less than 100 microns, less than 50 microns, and even less than 10 microns. Accordingly, MR heads 35 can be used with a planar array of write heads 33 to define a read write system functional at track pitches that are less than 100 microns, less than 50 microns, and even less than 10 microns.

Figure 5:
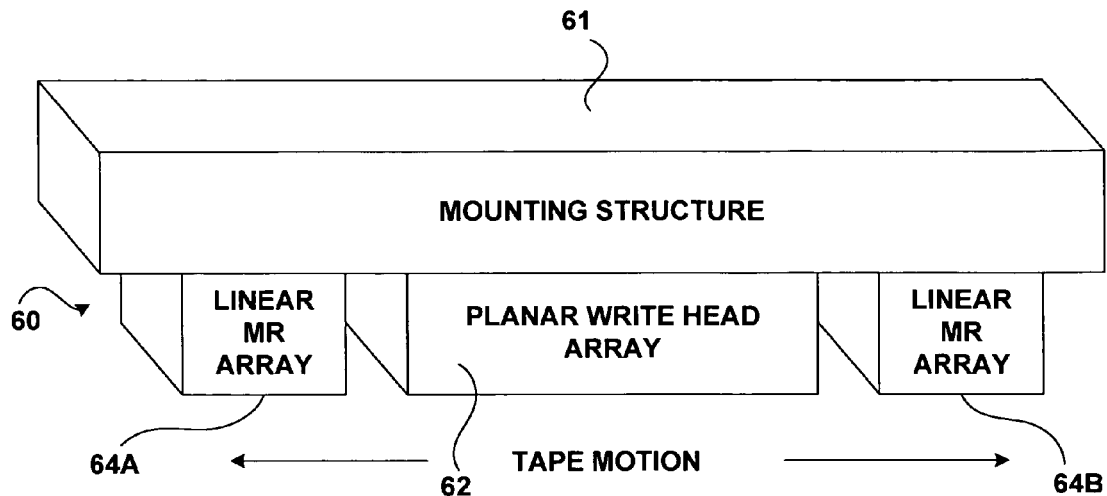
FIG. 5 is a perspective view of a system comprising a first linear array of MR heads, a second linear array of MR heads, and a planar array of write heads positioned between the first and second linear arrays of MR heads according to an embodiment of the invention.

FIG. 5 is a perspective view of a system 60 comprising a first linear array of MR heads 64A, a second linear array of MR heads 64B, and a planar array of write heads 62 positioned between the first and second linear arrays of MR heads 64A and 64B. Arrays 62, 64A and 64B can be mounted and aligned in mounting structure 61, e.g., using microscopes or other optical alignment techniques in order to ensure channel alignment between arrays 62, 64A and 64B. Alternatively, separate mounting structures or actuators may be used for the different arrays, and servo tracking could be performed independently for each array.

As illustrated, system 60 allows for read/write operations to occur regardless of the motion of the magnetic tape. For example, if the tape moves right-to-left, then the channels of planar array 62 can write data and the channels of first linear array 64A can read and verify the data written by the channels of planar array 62.

Alternatively, if the magnetic tape moves left-to-right, then the channels of planar array 62 can write data and the channels of second linear array 64B can read and verify the data written by the channels of planar array 62. Accordingly, system 60 allows for write and verify operations to be performed regardless of the direction tape motion relative to system 60.

Figure 6:
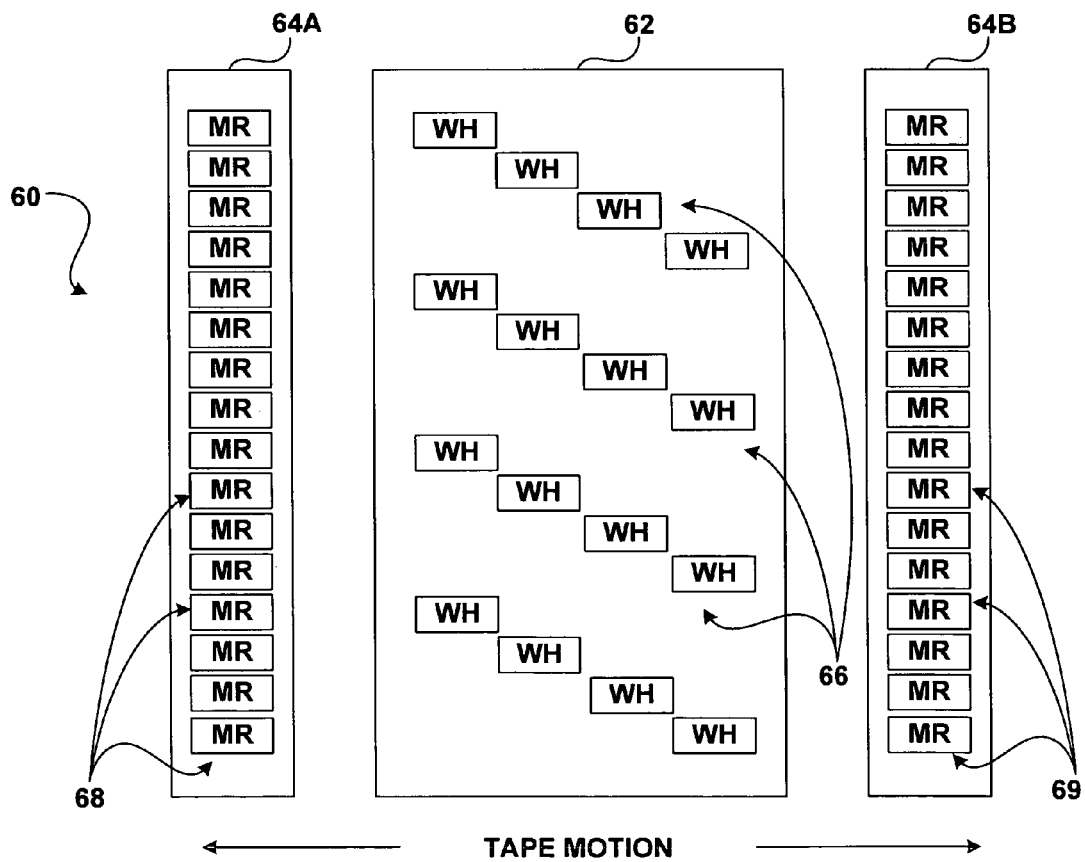
FIG. 6 is a bottom view of the system illustrated in FIG. 5.

FIG. 6 is a bottom view of system 60 illustrating planar array 62 of write heads and first and second linear arrays 64A and 64B of MR heads. In particular, planar array 62 comprises a set of write heads 66 arranged in a two-dimensional matrix, wherein each of the write heads defines a write channel for system 60 regardless of the direction of tape motion. First linear array 64A comprises a set of MR heads 68 arranged in a linear configuration to define read channels when the tape moves in a first direction relative to system 60. Second linear array 64B comprises a set of MR heads 69 arranged in a linear configuration to define read channels when the tape moves in a second direction relative to system 60. Thus, when the tape moves in a first direction (in this case right-to-left), planar array 62 is used to write data and first linear array 64A is used to read or verify the data, and when the tape moves in a second direction (in this case left-to-right), planar array 62 is used to write data and second linear array 64B is used to read or verify the data.

Importantly, each of write heads 66 substantially align with a corresponding one of MR heads 68 of first linear array 64A and corresponding one of MR heads 69 of second linear array 64B. Thus, each of arrays 62, 64A and 64B include a same number of heads. Again, although sixteen MR heads 68, sixteen MR heads 69, and sixteen write heads 66 are illustrated, system 60 may include any number heads in each of the respective arrays. As mentioned, however, in some cases, additional read heads may be provided for readout of servo positioning signals.

Figure 7:
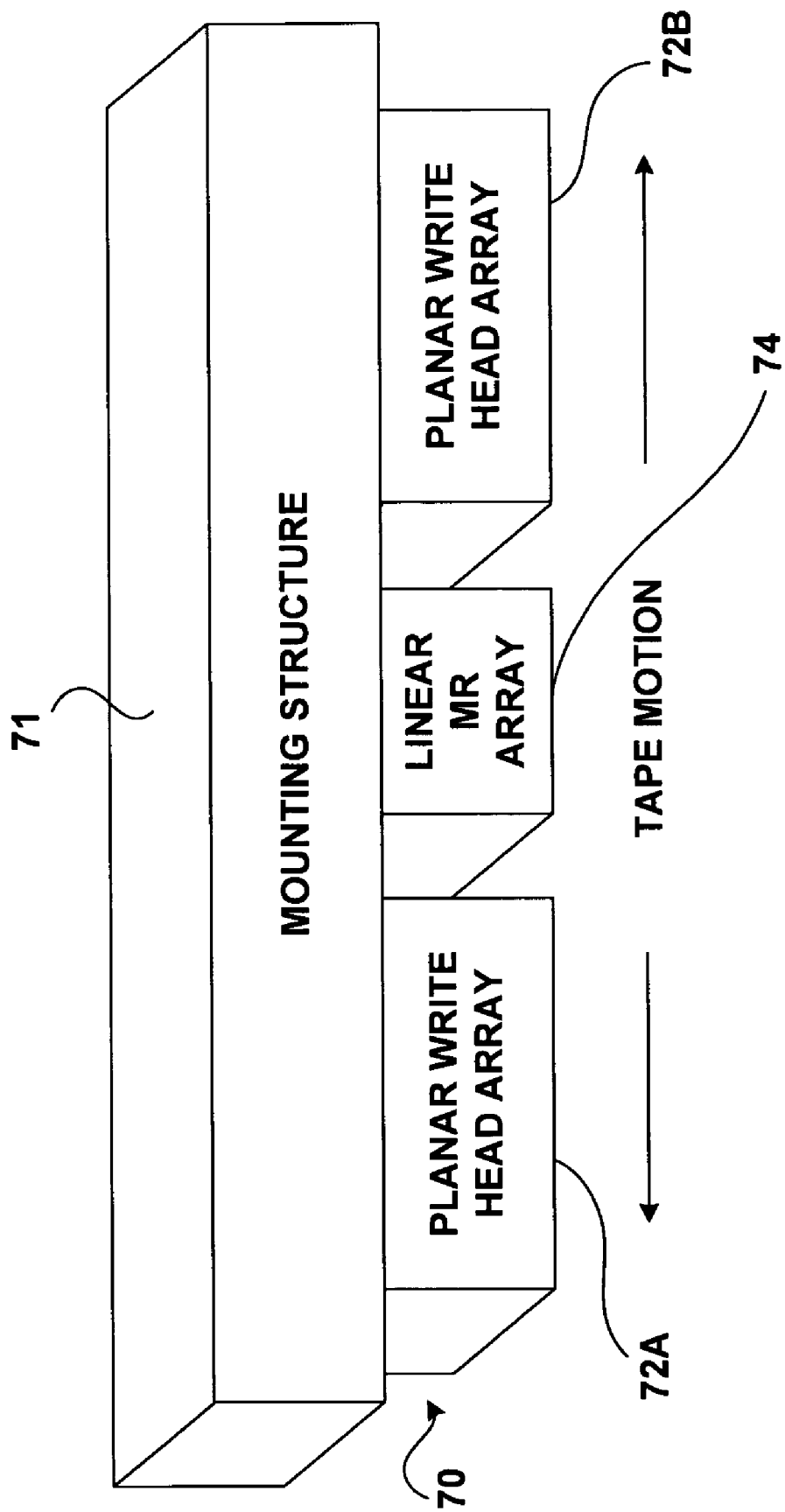
FIG. 7 is a perspective view of a system comprising a first planar array of write heads, a second planar array of write heads, and a linear array of MR heads positioned between the first and second planar arrays of write heads according to an embodiment of the invention.

FIG. 7 is a perspective view of a system 70 comprising a first planar array of write heads 72A, a second planar array of write heads 72B, and a linear array of MR heads 74 positioned between the first and second planar arrays of write heads 72A and 72B. Arrays 72A, 72B and 74 can be mounted and aligned in mounting structure 71, e.g., using microscopes or other optical alignment techniques in order to ensure channel alignment between arrays 72A, 72B and 74. Alternatively, separate mounting structures or actuators may be used for the different arrays, and servo tracking could be performed independently for each array.

Like system 60, system 70 of FIG. 7 allows for read/write operations to occur regardless of the motion of the magnetic tape. For example, if the tape moves left-to-right, then the channels of first planar array 72A can write data and the channels of linear array 74 can read and verify the data written by the channels of first planar array 72A.

Alternatively, if the magnetic tape moves right-to-left, then the channels of second planar array 72B can write data and the channels of linear array 74 can read and verify the data written by the channels of second planar array 72B. Accordingly, system 70 is another configuration which allows for write and verify operations to be performed regardless of the direction tape motion relative to system 70.

Figure 8:
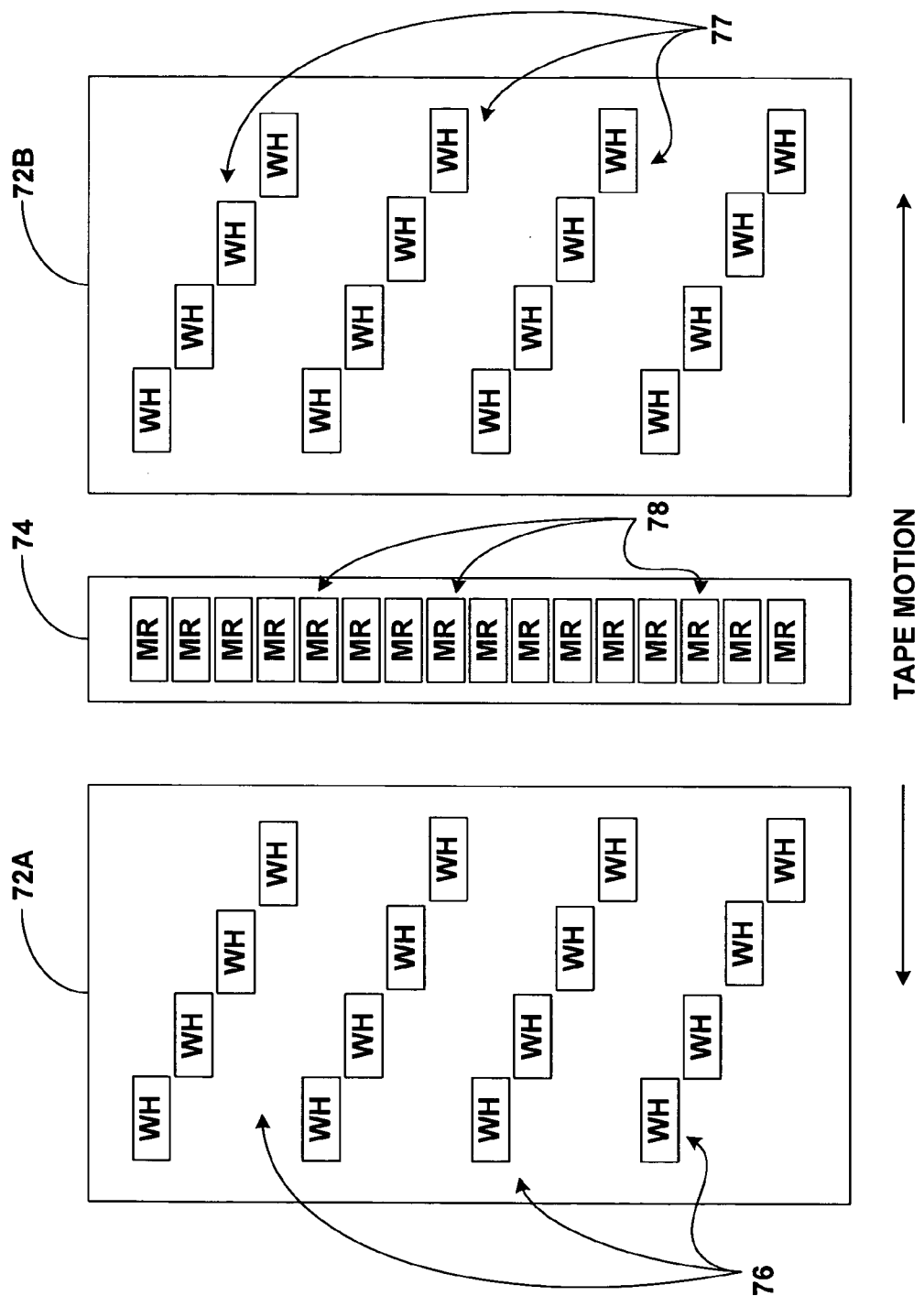
FIG. 8 is a bottom view of the system illustrated in FIG. 7.

FIG. 8 is a bottom view of system 70 illustrating linear array 74 of MR heads and first and second planar arrays 72A and 72B of write heads. In particular, first planar array 72A comprises a set of write heads 76 arranged in a two-dimensional matrix, wherein each of the write heads defines a write channel for system 70 when the magnetic tape moves in a first tape direction relative to system 70. Second planar array 72B comprises a set of write heads 77 arranged in another two-dimensional matrix, wherein each of the write heads defines a write channel for system 70 when the magnetic tape moves in a second tape direction relative to system 70.

Linear array 74 comprises a set of MR heads 78 arranged in a linear configuration, wherein the channels of linear array 74 allow for read and verify operations to be performed when the magnetic tape moves in either the first or second tape directions. Thus, when the tape moves in a first direction (in this case left-to-right), first planar array 72A is used to write data and linear array 74 is used to read or verify the data, and when the tape moves in a second direction (in this case right-to-left), second planar array 72B is used to write data and linear array 74 is used to read or verify the data.

Again, each of write heads 76 of first planar array 72A substantially align with a corresponding one of MR heads 78 of linear array 74. Also, each of write heads 77 of second planar array 72B substantially align with a corresponding one of MR heads 78 of linear array 74. Thus, each of arrays 72A, 72B and 74 may include a same number of heads, although additional read heads may also be provided for servo positioning signal readout. Again, although sixteen write heads 76, sixteen write heads 77, and sixteen MR heads 78 are illustrated, system 70 may include any number heads in each of the respective arrays.

Figure 9:
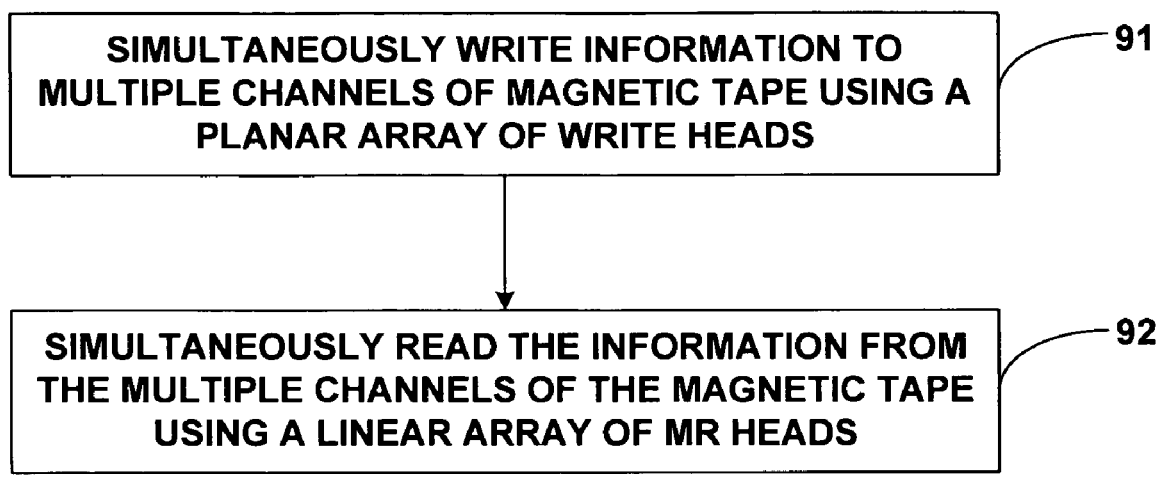
FIG. 9 is a flow diagram according to an embodiment of the invention.

FIG. 9 is a flow diagram according to an embodiment of the invention. As shown in FIG. 9, system 10 simultaneously writes information to multiple channels of magnetic tape using a planar array 12 of write heads (91). System 10 then simultaneously reads the information from the multiple channels of the magnetic tape using a linear array 14 of MR heads (92). In this manner, linear array 14 can serve as a verification mechanism to ensure the integrity of any data written by planar array 12.

In another example, planar array 62 of system 60 simultaneously writes information to multiple channels of magnetic tape regardless of the direction that the tape feeds relative to system. In that case, first linear array 64A simultaneously reads the information from the multiple channels of the magnetic tape when the tape feeds in a first direction, and second linear array 64A simultaneously reads the information from the multiple channels of the magnetic tape when the tape feeds in a second direction. In this manner, bi-directional read/write operations can be performed, with planar array 62 performing the write operations for both directions, first linear array 64A performing the read or verify operations for a first tape direction and second linear array 64B performing the read or verify operations for a second tape direction.

In another example, planar array 72A of system 70 simultaneously writes information to multiple channels of magnetic tape when the tape feeds in a first direction, and planar array 72B simultaneously writes information to multiple channels of magnetic tape when the tape feeds in a second direction. In that case, linear array 64 simultaneously reads the information from the multiple channels of the magnetic tape regardless of whether the tape feeds in the first or second direction. In this manner, bi-directional read/write operations can be performed, with planar arrays 72A and 72B performing the write operations different directions and linear array 74 performing the read or verify operations for both tape directions.

Figure 10:
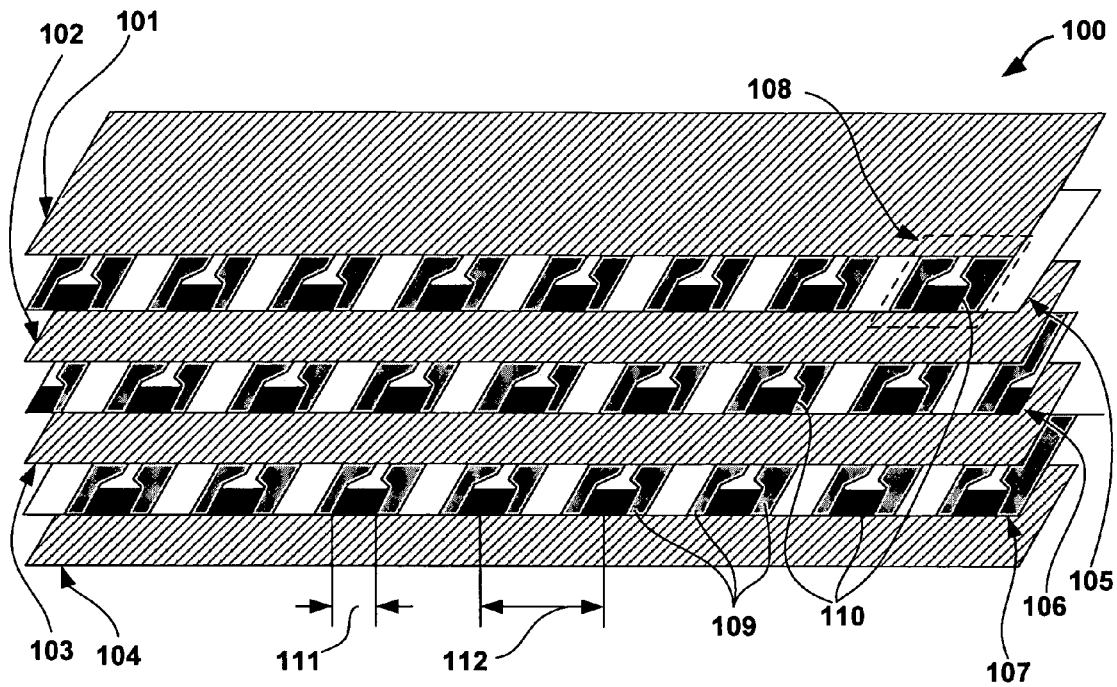
FIG. 10 is a conceptual exploded perspective view of a portion of a non-linear array of MR heads according to an embodiment of the invention.

FIG. 10 is a conceptual exploded perspective diagram illustrating a portion of a non-linear array 100 of MR heads arranged in a two-dimensional matrix to form a planar array. Non-linear array 100 of MR heads comprises three linear arrays 105-107 of MR heads which are stacked to define layers of non-linear array 100. Any number of linear arrays could be used in such a stacked configuration. Adjacent layers may have shared shields, although the invention is not necessarily limited in that respect. MR readers have shields, whereas write heads have poles.

The individual MR elements of each of linear arrays 105-107 may be offset by at least one width 111, which corresponds to the length of the MR gaps. Non-linear array 100 includes shield elements 101-104 between each of the linear arrays 105-107 of MR heads, respectively. In this example, each of linear arrays 105-107 shares at least one shield element with another of linear arrays 105-107. Non-linear array 100 may comprise a sandwich construction with any number of linear arrays separated by shield elements. In other words, although linear array 100 is illustrated having three linear arrays 105-107 separated by corresponding shield elements 101-104, the invention is not limited as such and may include any plurality of linear arrays sandwiched between shield elements. Non-linear array 100 can be fabricated using thin film deposition techniques and/or patterning techniques.

Each of linear arrays 105-107 includes a set of MR heads arranged in a linear configuration. Linear arrays 105-107 may comprise any type of MR heads, including giant magnetoresistive (GMR) heads. Each MR head 108 of linear arrays 105-107 is substantially similar but is separated by a distance of one head channel pitch 112 within a respective linear array. MR heads 108 include a magnetoresistive material 110 separated by conductive material 109. Magnetoresistive material 110 may comprise NiFe or any other material that exhibits properties in which the material resistance is responsive to magnetic fields. In other words, the resistance of sensor material 110 changes as a function of the magnetic field in close proximity to material 110. Thus, a track of magnetic tape can be passed under magnetoresistive sensor material 110 and magnetic changes in the track will affect the resistance of material 110. By way of example, conductive material 109 may comprise Cu, Au, or any other suitably conductive material.

Non-linear array 100 may have advantages in terms of quality of readout and ease of manufacture, relative to magneto-optic read heads or other read heads. For this reason, non-linear array 100 can allow for read operations at improved track pitches relative to conventional systems, and also provide a read system at reduced costs relative to a system that uses magneto-optic heads of readout. MR heads may also have better reading sensitivity and improved signal-to-noise ratios relative to magneto-optic read heads or other types of read heads capable of operating at the small track pitches described herein. Accordingly, such MR heads may be more reliable than magneto-optic heads or other read heads.

Figure 11:
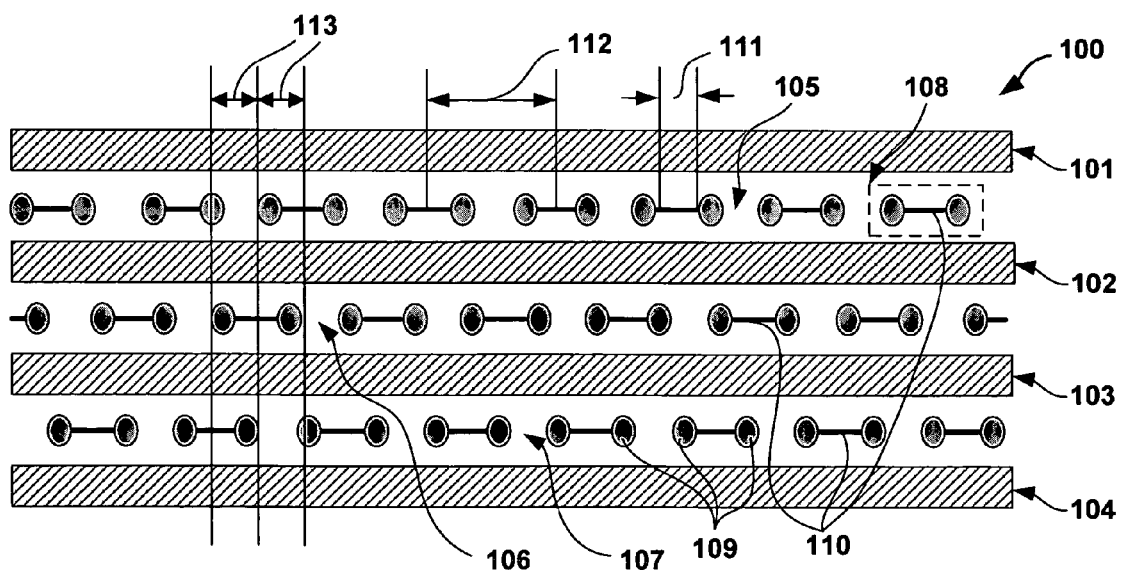
FIG. 11 is a conceptual bottom view of the portion of the non-linear array of MR heads illustrated in FIG. 10.

FIG. 11 is a conceptual bottom view of non-linear array 100 of MR heads illustrated in FIG. 10. Again, linear arrays 105-107 of MR heads are stacked to form a sandwich construction. Each of linear arrays 105-107 of MR heads comprise a layer of the sandwich construction and adjacent layers share at least one of shield elements 101-104 with another layer. In accordance with the invention, the elements of each of linear arrays 105-107 are offset relative to the elements of linear arrays. In this manner, the head channel pitches 113 of non-linear array 100 can be made to be significantly less than channel pitch 112 of a given linear array. As illustrated in FIG. 11, head channel pitches 113 can be defined such that portions of adjacent heads overlap. Moreover, because adjacent heads, i.e., successive heads used for readout of adjacent tracks, are defined in different layers, this overlapping is possible. In some cases, however, it may be advantageous to define additional distance between adjacent heads, thereby defining space between adjacent tracks. In accordance with the invention, head channel pitch 113 (and thus track pitch on a medium) can be made less than 20 microns or less than 10 microns.

Figure 12:
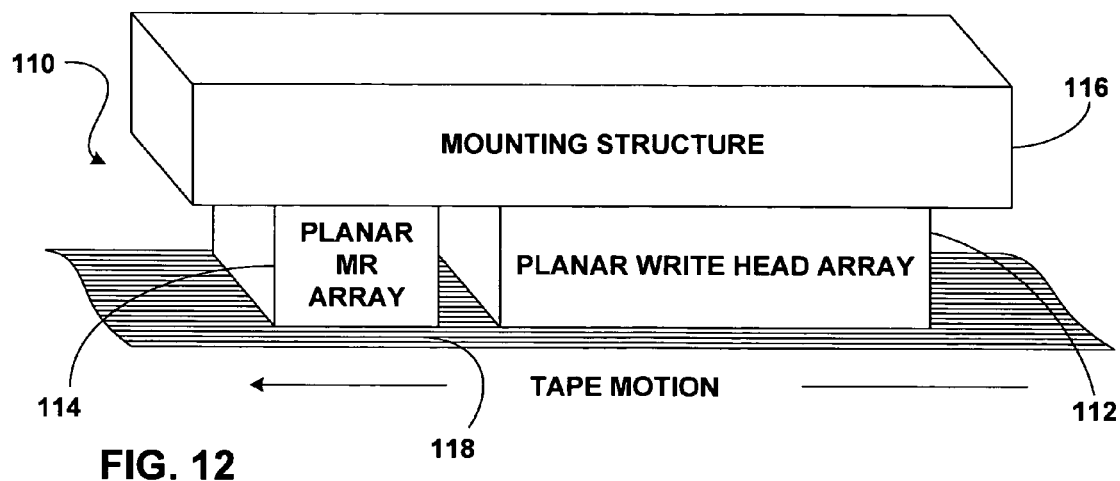
FIG. 12 is a perspective view of a system comprising a planar array of MR heads and planar array of write heads according to an embodiment of the invention.

FIG. 12 is a perspective view of a system 110 comprising a planar array 114 of MR heads and a planar array 112 of write heads. As described above, planar array 114 of MR heads comprises linear arrays of MR heads which are stacked to define layers of planar array 114. Any number of linear arrays could be used in such a stacked configuration. Planar array 114 of MR heads and planar array 112 of write heads may be precisely mounted into a mounting structure 116 in order to ensure that the channel of planar array 114 align with the channels of planar array 112. For example, microscopes or optical alignment techniques may be used in order to ensure channel alignment between arrays 114 and 112. Alternatively, separate mounting structures (not shown in FIG. 12) may be used for array 114 and array 112, allowing separate actuators to control the different arrays independently. In that case, for example, servo tracking could be preformed independently for each array.

Magnetic tape 118 can feed past planar array 112 of write heads and data can be written to different tracks of magnetic tape 118 via the different write heads of planar array 112. Each write head defines a channel of planar array 112, with each channel corresponding to a unique track on magnetic tape 118. Each MR head in planar array 114 also defines a channel. Each channel defined by a write head and a corresponding MR head align with a track on magnetic tape 118. Thus, each track on magnetic tape 118 can be written by a unique write head of planar array 112 and read by a unique MR head of planar array 114. One or more of the write heads of planar array 112 may also function as an inductive read element used for reading and tracking pre-written servo marks.

The tracks of magnetic tape 118 may be data tracks or servo tracks. Accordingly, the channels of planar array 112 may be used to record data or servo information, depending on the implementation of system 110. Planar array 114 of MR heads can simultaneously read information stored in the different tracks of magnetic tape 118. Magnetic tape 118 can feed past planar array 114 of MR heads and data can be read from the different tracks of magnetic tape 118 via the different MR heads of planar array 114. Like the channels of planar array 112, the channels of planar array 114 may be used to read data or servo information. In some cases, planar array 114 can be used independently of planar array 112, e.g., during readout of pre-recorded data. In other cases, planar array 114 may be used to read and verify information as it is recorded by planar array 112.

Figure 13:
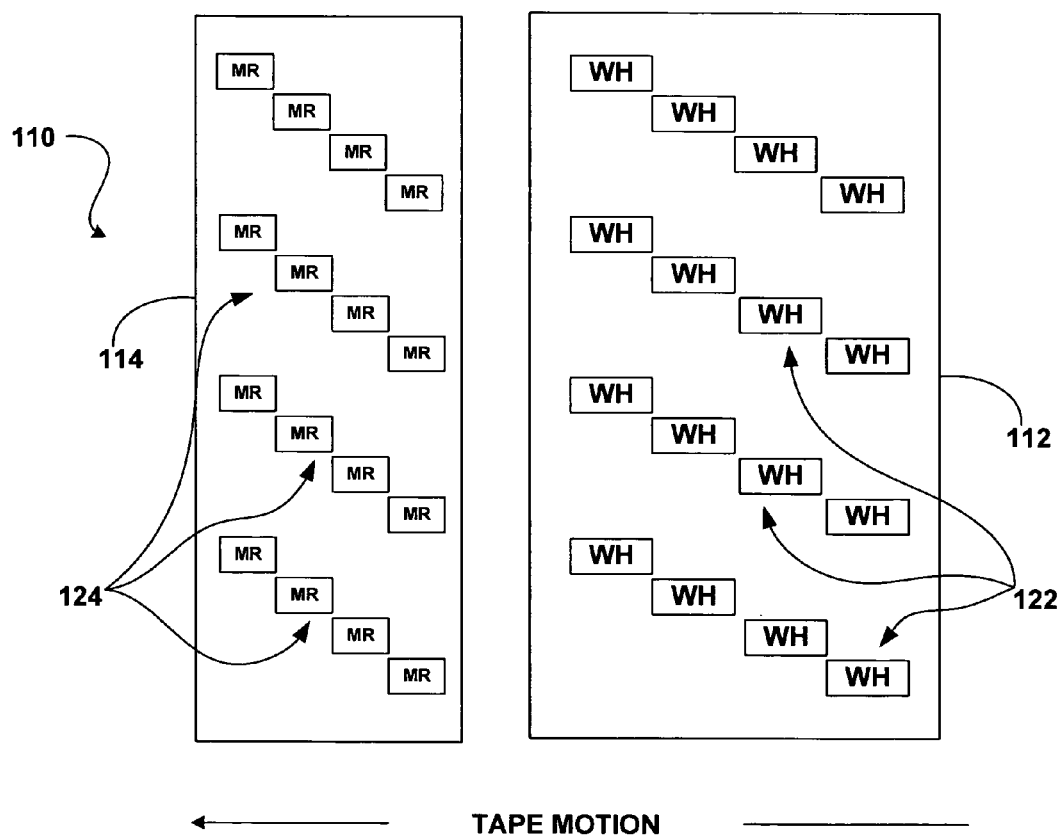
FIG. 13 is a bottom view of the system illustrated in FIG. 12.

FIG. 13 is a bottom view of system 110 illustrating planar array 112 of write heads and planar array 114 of MR heads. In particular, planar array 112 comprises an array of write heads 122 arranged in a two-dimensional matrix and planar array 114 comprises an array of MR heads 124 arranged in a two-dimensional matrix. Each of the write heads of planar array 112 defines a write channel for system 110 and each of the MR heads of planar array 114 defines a read channel for system 110.

Again, planar array 114 comprises a set of MR heads 124 arranged in a planar configuration consistent with the illustrations of FIGS. 10 and 11. Importantly, each of write heads 122 substantially align with a corresponding one of MR heads 124. Thus, system 110 may include a same number of write heads 122 and MR heads 124. Although sixteen MR heads 124 and sixteen write heads 122 are illustrated, system 110 may include any number of MR heads 124 and a corresponding number of write heads 122. In some cases, however, additional writes heads 122 may be included to read servo positioning signals. In other words, array 114 of read heads may include additional read heads that do not necessarily align with a respective write head, which may be used, e.g., for servo tracking.

The invention can allow for operations at improved track pitches relative to conventional read/write systems. Accordingly, the invention can facilitate increased storage densities on magnetic media, and is particularly useful for increasing the storage densities of magnetic tape. In particular, track pitches less than 20 microns or even less than 10 microns can be achieved. Additionally, the invention may have advantages in terms of quality and ease of manufacture, relative to magneto-optical read heads or other read heads.

As described above, head channel pitch reductions in magnetic tape systems is conventionally limited by difficulties in reducing the spacing between write heads in a linear array of write heads. In other words, head channel pitch in magnetic tape systems is conventionally limited by write coils. In particular, the pitch of the excitation coil of write heads has generally resulted in track pitch limits in conventional magnetic writing devices. In order to address such pitch limitations, the invention provides for a planar array 112 of write heads 122 arranged in a two-dimensional matrix. Accordingly, channel pitches of adjacent write heads 122 are not limited by the pitch of the excitation coils. In some cases, the excitation coil of write heads 122 can be coiled into a direction perpendicular to the plane of planar array 112 so as to further avoid conventional track pitch limitations. Moreover, an array of write heads with excitation coils perpendicular to the plane of the array can also be formed in an integrated circuit. In any case, planar array 112 is used with a planar array of MR heads 114. When a matrix type writer is used, for example, the pitch becomes limited by the reader conductor spacing and so a planar array of MR heads 114 further improves the system.

Another problem with track pitch reduction results from material mismatch between magnetic tape and read/write heads. Material mismatch can lead to misalignment between tracks and read/write heads due to differences in thermal and hydroscopic expansion coefficients. The non-linear arrangement of MR heads and write heads in respective planar arrays can address these problems by facilitating reduced channel pitches. Track/head misalignment problems are reduced because dimensional changes to the medium are averaged across a large number of head channel pitches, and therefore the reduced head channel pitch results in a corresponding reduction in misalignment. In a planar array arrangement of MR heads, the MR head channel pitch is greatly reduced, hence the distance spanned by the head channels is also reduced. As described previously, each set of MR heads 124 arranged in a linear array to form planar array 114 is offset relative to the other sets of MR heads 124. In this manner, the head channel pitches of planar array 114 can be made to be significantly less than the channel pitch of a given linear array because portions of adjacent heads can overlap, e.g., the conductors of adjacent heads can overlap because they are in different layers. Therefore, the system described herein can facilitate very small head channel pitches and therefore read and write operations at very small track pitches.

Each of write heads 122 substantially align with a corresponding one of MR heads 124. In this manner, each channel of system 110 includes a unique one of write heads 122 and a corresponding unique one of read heads 124. Each channel corresponds to a track on the medium to be recorded, e.g., a data track or servo track on magnetic tape. In accordance with the invention, the track pitch (and head channel pitch) can be made less than 20 microns or even less than 10 microns. Channel pitches on this order are generally not achievable with a linear array of write heads that include excitation coils. To achieve such channel pitches for the write heats, a planar array is generally needed. Moreover, the invention may incorporate a planar array of MR heads with the planar array of write heads to address any track pitch limitations of a linear array of MR heads.

Figure 14:
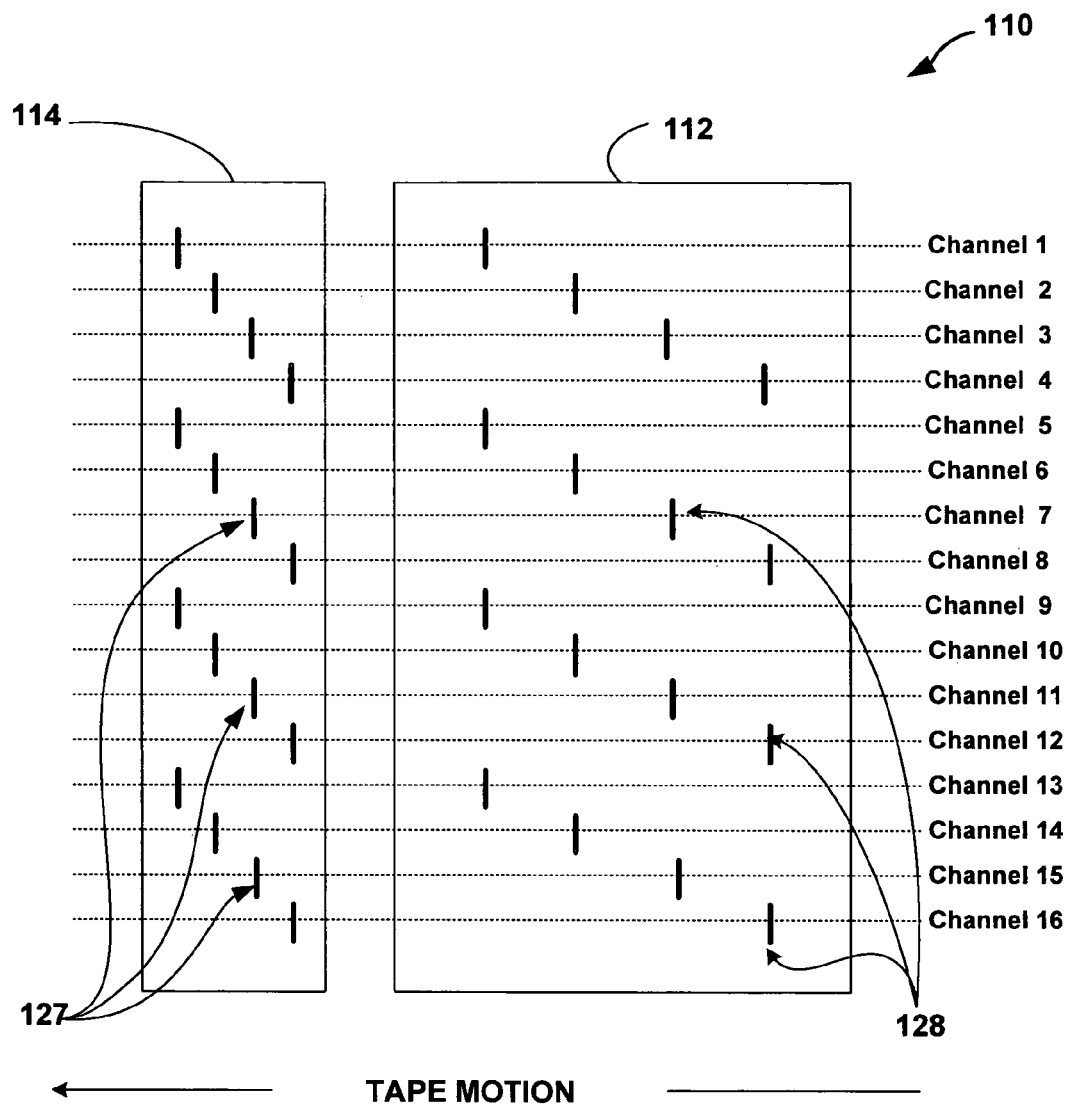
FIG. 14 is another bottom view rendition of the system illustrated in FIG. 12.

FIG. 14 is another bottom view rendition of system 110 comprising planar array 112 of write heads and planar array 114 of MR read heads. In the illustration of FIG. 14, planar array 112 comprises an array of write heads which are illustrated as write gaps in a two-dimensional matrix and planar array 114 comprises an array of MR heads which are illustrated as gaps 127 arranged in a two-dimensional matrix. Again, each of the write heads (or write gaps) defines a write channel for system 110 and each of the MR heads of planar array 114 defines a read channel for system 110.

In particular, planar array 112 comprises a set of write heads 122 arranged in a two-dimensional matrix and planar array 114 comprises a set of MR heads 124 arranged in a two-dimensional matrix. Each of the write heads of planar array 112 defines a write channel for system 110 and each of the MR heads of planar array 114 defines a read channel for system 110. Importantly, each of write heads 122 substantially align with a corresponding one of MR heads 124. In some cases, however, the array of read heads may include additional read heads that do not necessarily align with a write heads, which may be used, e.g., for servo tracking. Sixteen channels are labeled on FIG. 14.

Each channel can be viewed as being defined by a corresponding head of planar array 114, a corresponding head of planar array 112, or both. In any case, the invention incorporates a planar array 114 of MR heads with a planar array 112 of write heads to facilitate a system that can operate at improved track pitches relative to conventional read/write systems. Again, such track pitches may be less than 20 microns or even less than 10 microns. At such track pitches, data storage densities of magnetic media can be enhanced, particularly for magnetic tape.

By way of example, planar array 112 of write heads may comprise a fully integrated matrix magnetic recording head with independent control such as that substantially described in previously referenced U.S. Patent Publication 2003/0011922. Other configurations of planar array 112, however, may also be used. In FIG. 14, the write heads are illustrated as gaps 128 arranged in a planar matrix configuration, although non-planar matrix configurations could also be used.

A planar array of MR heads may have advantages in terms of quality of readout and ease of manufacture, relative to magneto-optic read heads or other read heads. For this reason, the combination of a linear array of MR heads with a planar array of write heads can allow for read and write operations at improved track pitches relative to conventional systems, and also provide a read/write system at reduced costs relative to a system that uses magneto-optic heads for readout. MR heads may also have better reading sensitivity and improved signal-to-noise ratios relative to magneto-optic read heads or other types of read heads capable of operating at the small track pitches described herein. Accordingly, MR heads may be more reliable than magneto-optic heads or other read heads.

Figure 15:
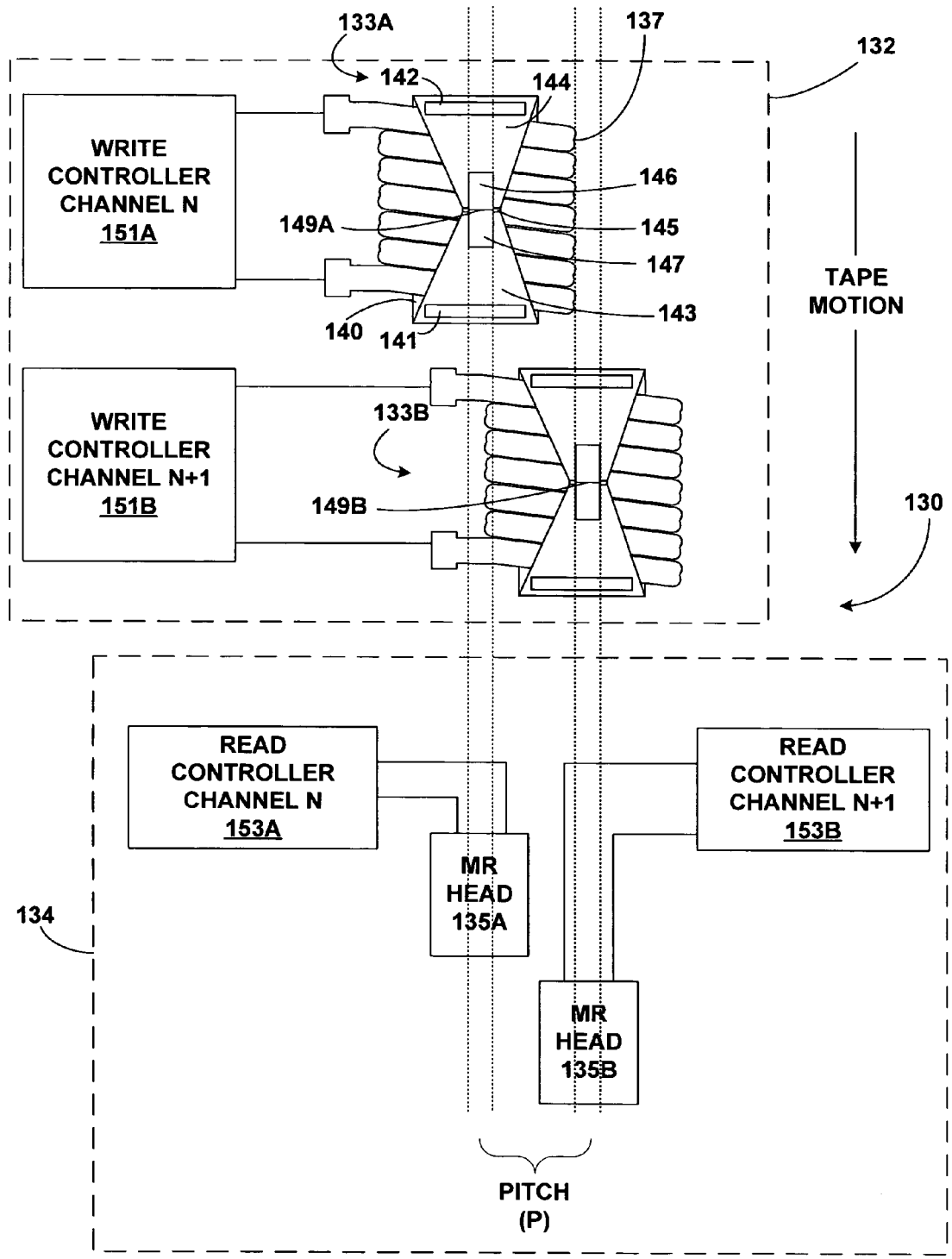
FIG. 15 is a block diagram illustrating a portion of a planar array of write heads and a portion of a planar array of MR heads according to an embodiment of the invention.

FIG. 15 is a block diagram of system 130 illustrating a portion of a planar array 132 of write heads and a portion of a planar array 134 of MR heads. In this case, only two channels of planar array 132 and a corresponding two channels of planar array 134 are illustrated. For example, a first channel is defined by first write head 133A and first MR head 135A, and a second channel is defined by second write head 133B and second MR head 135B.

Write heads 133A and 133B are substantially similar but separated by a distance of one head channel pitch (P). In particular, the write gaps 149A and 149B of write heads 133A and 133B are separated by the head channel pitch (P). Write heads 133 will be described with reference to head 133A. Again, however, write head 133B is substantially similar to write head 133A.

Write head 133A comprises a magnetic circuit fabricated onto a non-magnetic substrate. Write head 133A includes an excitation coil 137 that coils in a direction perpendicular to the plane defined by planar array 132. This can help reduce the size of the array and also facilitate the matrix configuration in an integrated circuit.

In particular, excitation coil 137 wraps around a bottom pole piece 140. Bottom pole piece 140, two pillars 141, 142 and two concentrators 143, 144 are made of a magnetic material such as NiFe or another soft magnetic material. Concentrators 143, 144 are interrupted so as to define a gap 145. On top of gap 145 are additional pole pieces 146, 147 formed of a high saturation magnetization material that can prevent detrimental saturation of the poles when data is being written. For example, pole pieces 146, 147 may comprise sputtered FeTaN/TaN multilayers or plated FeCoNi, FeCoCr or NiFe. Pole pieces 146, 147 define write gap 149A used for writing magnetic signals to the magnetic medium. Head 133A can be formed by thin film deposition and patterning techniques generally known in the art. Additional details of exemplary write heads 133 can be found in previously referenced U.S. Patent Publication 2003/0011922.

Write heads 133 are separately controllable via write controllers 151A and 151B, which may comprise a common unit or module that controls both channels. Accordingly, signals can be written to adjacent tracks on a magnetic medium using write heads 133. Importantly, the illustrated configuration of write heads 133 allows for head channel pitch, and thus track pitches that are less than 20 microns and even less than 10 microns. Moreover, write heads 133 may also function as an inductive read element used for reading and tracking pre-written servo marks.

MR heads 135A and 135B may comprise any type of MR read heads, including giant magnetoresistive (GMR) heads. MR heads 135A and 135B are arranged in a non-linear configuration. MR heads 135A and 135B are substantially similar but separated by a distance of one head channel pitch (P).

Each MR head includes a magnetoresistive sensor material separated by conductive materials. The magnetoresistive sensor material may comprise NiFe or any other material that exhibits properties in which the material resistance is responsive to magnetic fields. In other words, the resistance of sensor material changes as a function of the magnetic field in close proximity to material. Thus, a track of magnetic tape can be passed under magnetoresistive sensor material and magnetic changes in the track will affect the resistance of material. By way of example, the conductive materials that surround magnetoresistive sensor material may comprise Au or any other suitably conductive material.

Read controller 153A provides either constant voltage or constant current across the conductive materials of MR heads 135A and 135B. Read controller 153A then measures changes in voltage or current, e.g., according to Ohm's Law, in order to identify changes in the resistance. In this manner, magnetic changes recorded on a track of magnetic tape can be detected by MR heads 135A and 135B.

MR heads 135A and 1351B are separately controllable via read controllers 153A and 153B, which may comprise a common unit or module that controls both channels. In some cases, controllers 151A, 151B, 153A and 153B are all implemented in a common unit. In any case, signals can be read from adjacent tracks on a magnetic medium using MR heads 135. The illustrated configuration of MR heads 135, or variations thereof, allow for head channel pitch, and thus track pitches that are less than 20 microns and even less than 10 microns. Accordingly, a planar array of MR heads 135 can be used with a planar array of write heads 133 to define a read write system functional at very small track pitches.

Figure 16:
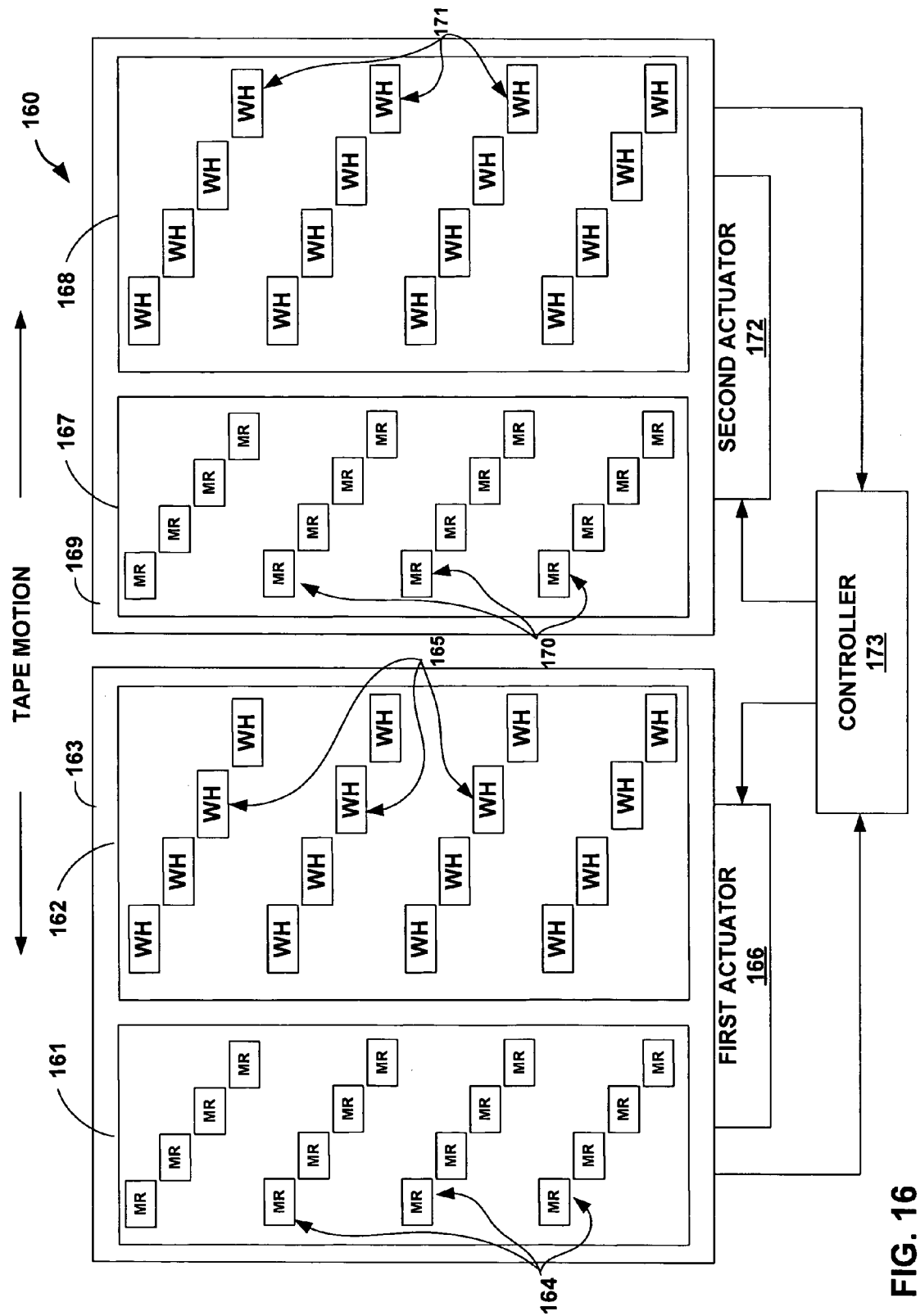
FIG. 16 is a block diagram of a system including a first array of write heads, a first array of MR heads, a first actuator coupled to the first arrays of write and read heads, a second array of write heads, a second array of MR heads, and a second actuator coupled to the second arrays of write and read heads according to an embodiment of the invention.

FIG. 16 is a block diagram of system 160 comprising a first array of write heads 162, a first array of MR heads 161, a first actuator 166 coupled to a first array of write heads 162 and first array of MR heads 161 heads, a second array of write heads 168, a second array of MR heads 167, and a second actuator 172 coupled to a second array of write heads 168 and second array of MR heads 167. In particular, each of first array of write heads 162 and first array of MR heads 161 is arranged in a two-dimensional matrix, wherein each of write heads 165 and MR heads 164 define a write channel for system 160 in a first tape direction and a read channel for system 160 in a second tape direction, respectively. First actuator 166 collectively moves first array of write heads 162 with first array of MR heads 161 in response to signals received from controller 173.

Second array of write heads 168 and second array of MR heads 167 are also arranged in two-dimensional matrices, wherein each of write heads 171 and MR heads 170 define a write channel for system 160 in second tape direction and a read channel for system 160 in a first tape direction, respectively. Second actuator 172 collectively moves second array of write heads 168 with second array of MR heads 167 in response to signals received from controller 173. Arrays 161 and 162 may be mounted in mounting structure 163 and arrays 167 and 168 may be mounted in mounting structure 169. In this embodiment, however, alignment between arrays 161 and 162 or between arrays 167 and 168 is less of a concern because the separate actuators 166 and 172 allow for independent control of the different mounting structures 163 and 169. Accordingly, a write array of one mounting structure can be used with the read array on the other mounting structure in a given tape direction, allowing for separate control of the arrays. By avoiding precision alignment within a given mounting structure, fabrication of system 160 can be simplified.

Again, each of first and second arrays of MR heads 161 and 167 comprises a set of MR heads arranged in a configuration consistent with the illustrations of FIGS. 10 and 11. Controller 173 communicates with first and second actuators 166 and 172 via electronic signals in order to control first and second actuators 166 and 172 so that first array of write heads 162 substantially aligns with second array of MR heads 167 and second array of write heads 168 substantially aligns with first array of MR heads 161.

As a result, system 160 allows for read/write operations to occur regardless of the motion of the magnetic tape. For example, if the tape moves right-to-left, then first array of write heads 162 may be used simultaneously with second array of MR heads 167. In this manner, first array of write heads 162 can write data and the channels of second array of MR heads 167 can read and verify the data written by the channels of first array of write heads 162. Alternatively, if the magnetic tape moves left-to-right, then second array of write heads 168 may be used simultaneously with first array of MR heads 161. Consequently, second array of write heads 168 can write data and the channels of first array of MR heads 161 can read and verify the data written by the channel of second array of write heads 168. Accordingly, system 160 allows for write and verify operations to be performed regardless of the direction tape motion relative to system 160. Also, the separate actuators eliminate the need for precision alignment within a given mounting structure.

Figure 17:
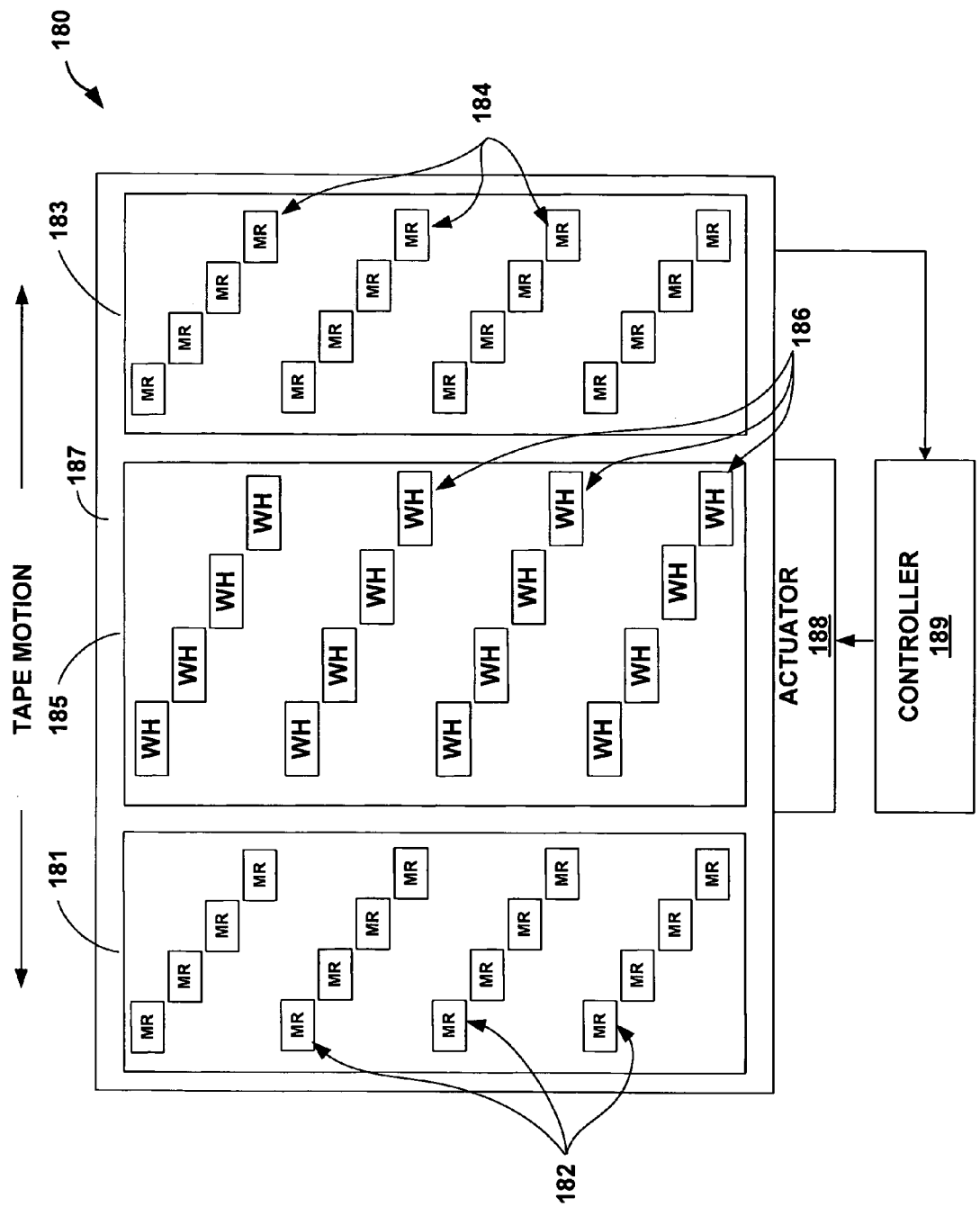
FIG. 17 is a block diagram of a system including a first array of MR heads, a second array of MR heads, an array of write heads, and an actuator coupled to the first and second arrays of MR heads and the array of write heads according to an embodiment of the invention.

FIG. 17 is a block diagram of a system 180 comprising a first array of MR heads 181, a second array of MR heads 183, an array of write heads 185, and an actuator 188 coupled to first array of MR heads 18 1, second array of MR heads 183, and an array of write heads 185. In particular, actuator may couple to a mounting structure 187 onto which the arrays 181, 183 and 185 are mounted.

Array of write heads 185 comprises a set of write heads 186 arranged in a two-dimensional matrix, wherein each of write heads 186 defines a write channel for system 180 regardless of the direction of tape motion. First array of MR heads 181 comprises a set of MR heads 182 arranged to define read channels when the tape moves in a first direction relative to system 180. Second array of MR heads 183 comprises a set of MR heads 184 to define read channels when the tape moves in a second direction relative to system 180. Thus, when the tape moves in a first direction (in this case right-to-left) array of write heads 185 is used to write data and first array of MR heads 181 is used to read or verify the data, and when the tape moves in a second direction (in this case left-to-right), array of write heads 185 is used to write data and second array of MR heads 183 is used to read or verify the data.

First array of MR heads 181, second array of MR heads 183, and array of write heads 185 can be mounted and aligned in mounting structure 187, e.g. using microscopes or other optical alignment techniques in order to ensure channel alignment between array of write heads 185 and first and second arrays of MR heads 181 and 183. Actuator 188 collectively moves array of write heads 185 with first and second arrays of MR heads 181 and 183 in response to signals received from controller 189.

Figure 18:
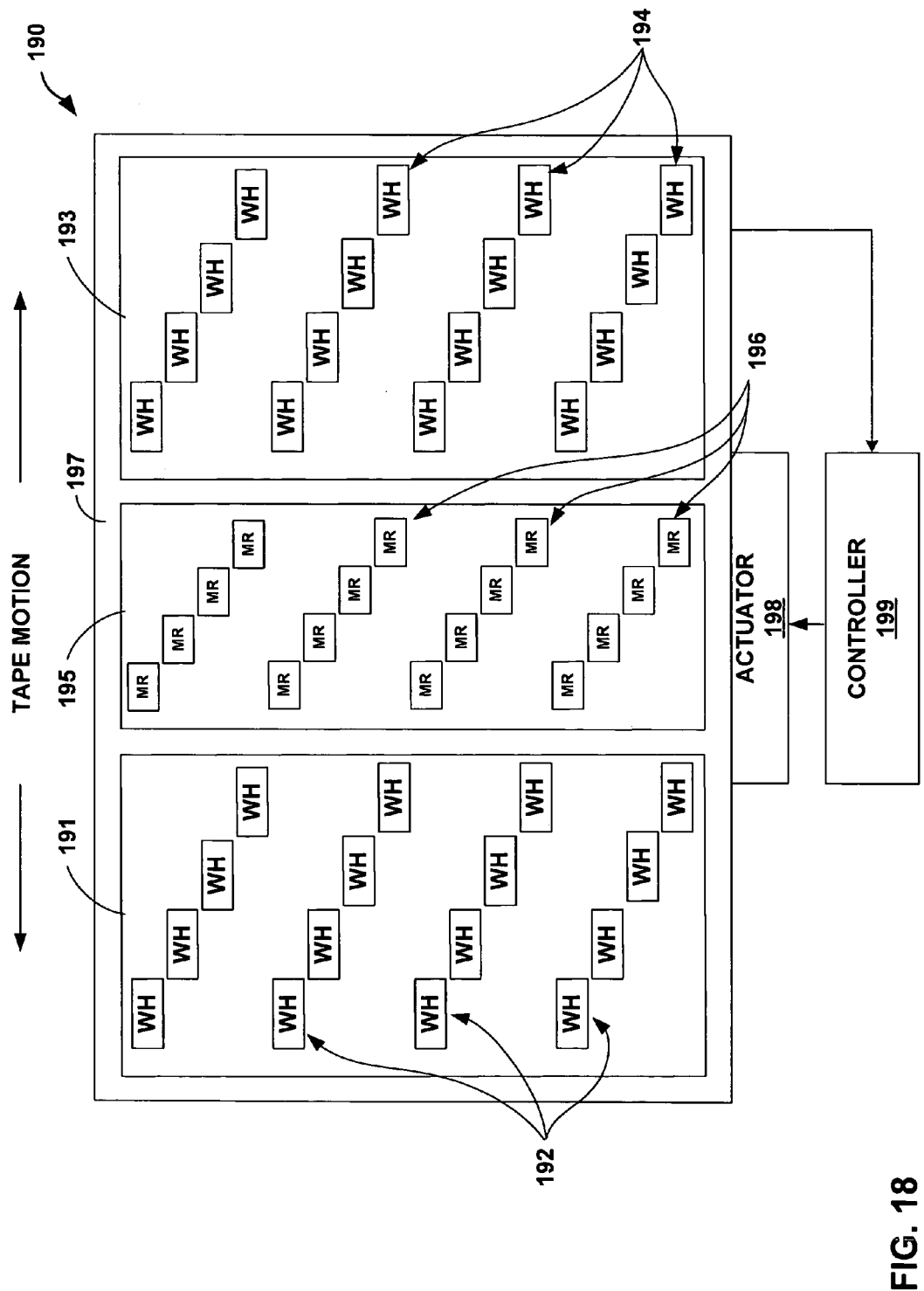
FIG. 18 is a block diagram of a system including a first array of write heads, a second array of write heads, an array of MR heads, and an actuator coupled to the first and second arrays of write heads and the array of MR heads according to an embodiment of the invention.

FIG. 18 is a block diagram of a system 190 comprising a first array of write heads 191, a second array of write heads 193, an array of MR heads 195, and an actuator 198 coupled to first array of write heads 191, second array of write heads 193, and array of MR heads 195. In particular, first array of write heads 191 comprises a set of write heads 192 arranged in a two-dimensional matrix, wherein each of the write heads defines a write channel for system 190 when the magnetic tape moves in a first tape direction relative to system 190. Second array of write heads 193 comprises a set of write heads 194 arranged in another two-dimensional matrix, wherein each of the write heads defines a write channel for system 190 when the magnetic tape moves in a second tape direction relative to system 190.

Again, array of MR heads 195 comprises a set of MR heads 196 arranged in a two-dimensional matrix consistent with the illustrations of FIGS. 10 and 11, wherein the channels of array of MR heads 195 allow for read and verify operations to be performed when the magnetic tape moves in either the first or second tape directions. Thus, when the tape moves in a first direction (in this case left-to-right), first array of write heads 191 is used to write data and array of MR heads 195 is used to read or verify the data, and when the tape moves in a second direction (in this case right-to-left), second array of write heads 193 is used to write data and array of MR heads 195 is used to read or verify the data.

First array of write heads 191, second array of write heads 193, and array of MR heads 195 can be mounted and aligned in mounting structure 197, e.g., using microscopes or other optical alignment techniques in order to ensure channel alignment between array of MR heads 195 and first and second arrays of write heads 191 and 193. Actuator 198 collectively moves array of MR heads 195 with first and second arrays of write heads 191 and 193 in response to signals received from controller 199.

Figure 19:
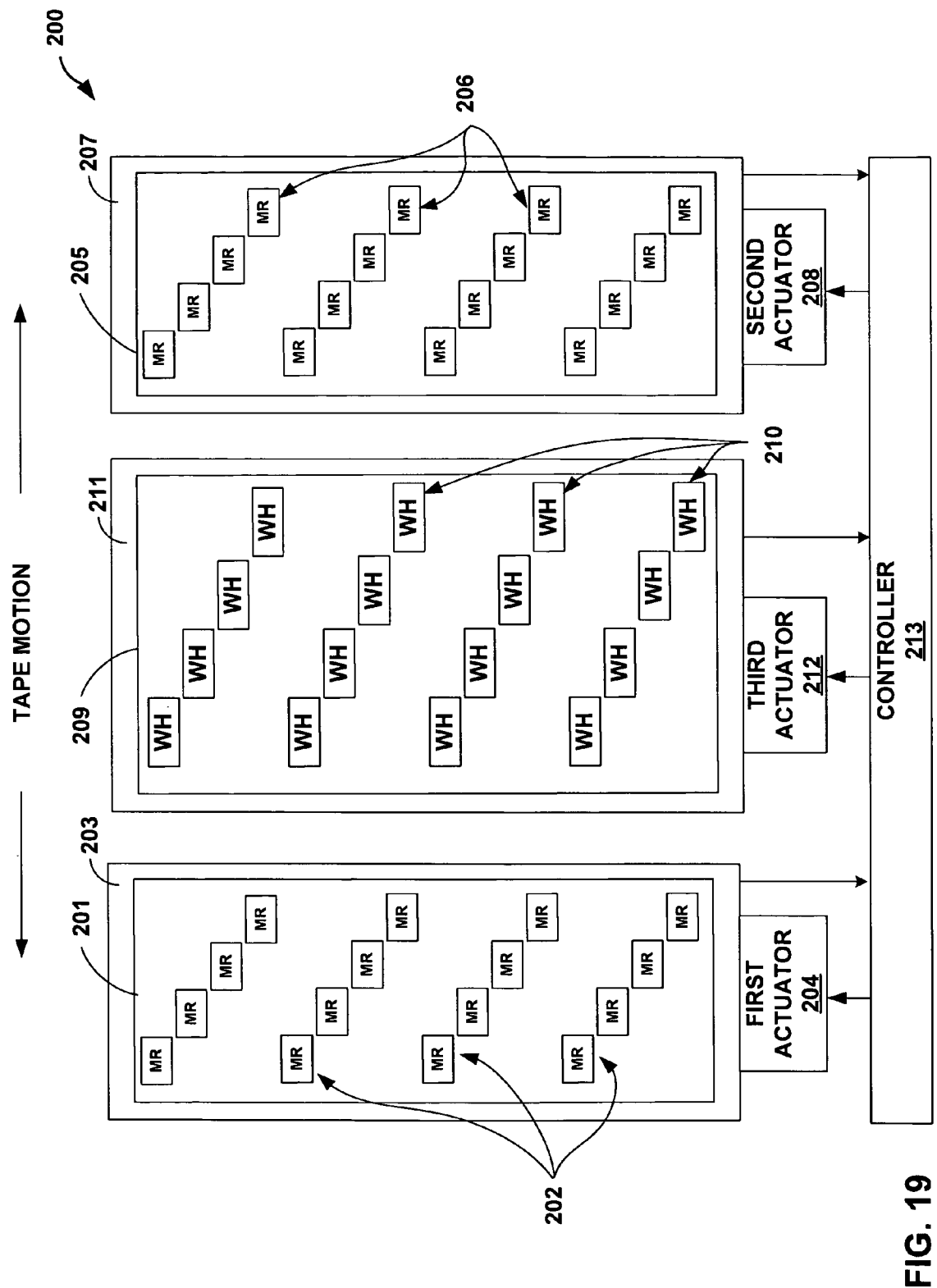
FIG. 19 is a block diagram of a system including a first array of MR heads, a first actuator coupled to the first array of MR heads, a second array of MR heads, a second actuator coupled to the second array of MR heads, an array of write heads, and a third actuator coupled to the array of write heads according to an embodiment of the invention.

FIG. 19 is a block diagram of system 200 including a first array of MR heads 201, a first actuator 204 coupled to first array of MR heads 201, a second array of MR heads 205, a second actuator 208 coupled to second array of MR heads 205, an array of write heads 209, and a third actuator 212 coupled to array of write heads 209. In particular, array of write heads 209 comprises a set of write heads 210 arranged in a two-dimensional matrix, wherein each of write heads 210 defines a write channel for system 200 regardless of the direction of tape motion.

First array of MR heads 201, second array of MR heads 205, and array of write heads 209 can be mounted in different mounting structures 203, 207, and 211, respectively. Separate actuators 204, 208 and 212 control the position of the heads in mounting structures 203, 207, and 211 at the direction of controller 213. First, second and third actuators 204, 208, and 212 can allow for independent positioning of first array of MR heads 201, second array of MR heads 205, and array of write heads 209, regardless of the direction of tape motion.

First array of MR heads 201 comprises a set of MR heads 202 arranged to define read channels when the tape moves in a first direction relative to system 200. Second array of MR heads 205 comprises a set of MR heads 206 to define read channels when the tape moves in a second direction relative to system 200. Thus, when the tape moves in a first direction (in this case right-to-left), array of write heads 209 is used to write data and first array of MR heads 201 is used to read or verify the data, and when the tape moves in a second direction (in this case left-to-right), array of write heads 209 is used to write data and second array of MR heads 205 is used to read or verify the data.

Figure 20:
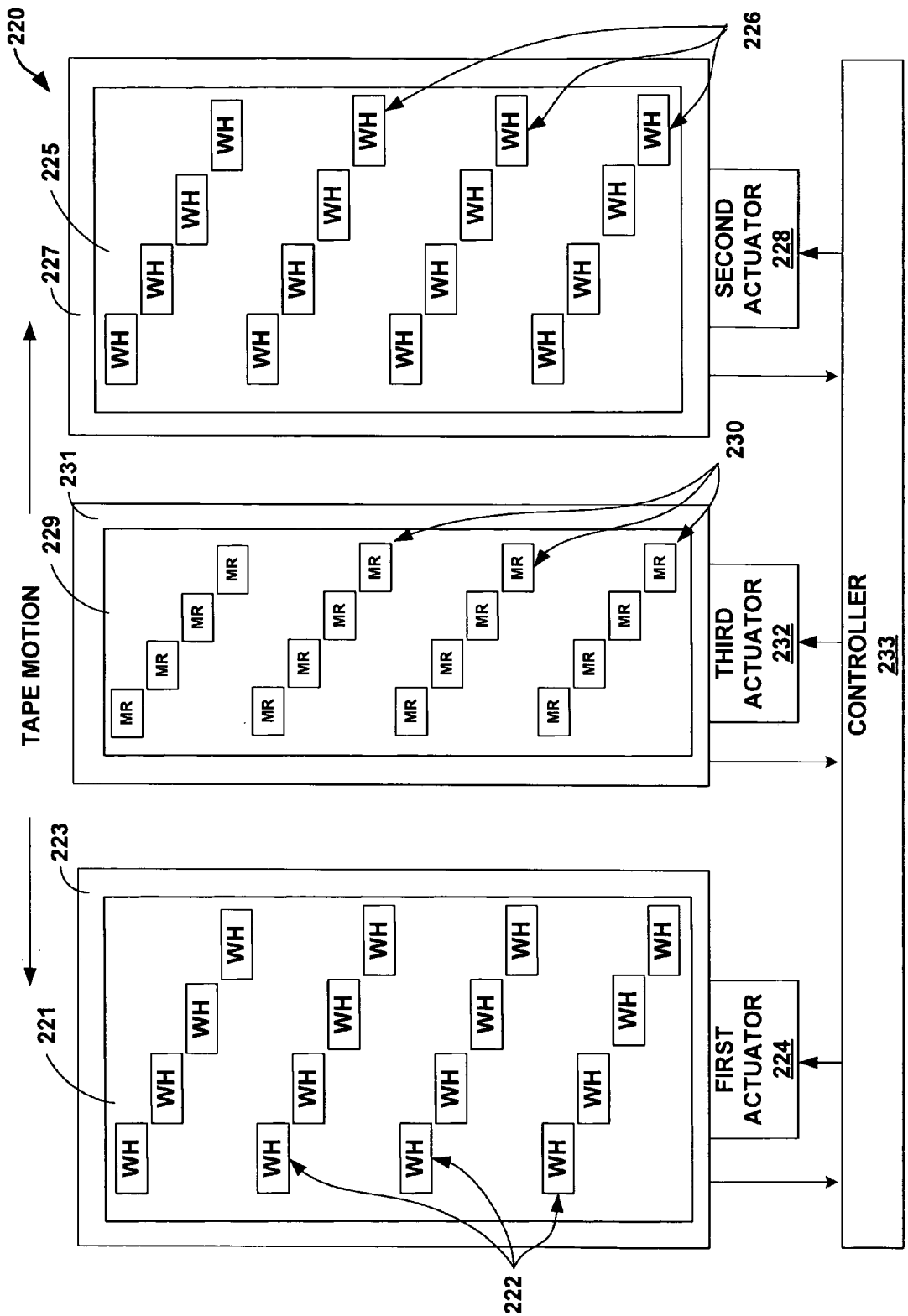
FIG. 20 is a block diagram of a system including a first array of write heads, a first actuator coupled to the first array of write heads, a second array of write heads, a second actuator coupled to the second array of write heads, an array of MR heads, and a third actuator coupled to the array of MR heads according to an embodiment of the invention.

FIG. 20 is a block diagram of system 220 including a first array of write heads 221, a first actuator 224 coupled to first array of write heads 221, a second array of write heads 225, a second actuator 228 coupled to second array of write heads 225, an array of MR heads 229, and a third actuator 232 coupled to array of MR heads 229. Controller 233 controls actuators 224, 228, and 232 in response to signals detected by arrays 221, 225, and 229, respectively, or possibly in response to the detection of servo marks via servo elements (not shown). In some cases, one or more of the heads of the different arrays may be used for such servo detection. First, second and third actuators 224, 228, and 232 can allow for independent positioning of first array of write heads 221, second array of write heads 225, and array of MR heads 229, regardless of the direction of tape motion. When the tape moves in a first direction (in this case left-to-right), first array of write heads 221 is used to write data and array of MR heads 229 is used to read or verify the data, and when the tape moves in a second direction (in this case right-to-left), second array of write heads 225 is used to write data and array of MR heads 229 is used to read or verify the data. First array of write heads 221, second array of write heads 225, and the array of MR heads 229 are mounted in different mounting structures 223, 227, and 231, respectively. First array of write heads 221 comprise a set of write heads 222 arranged to define write channels in one tape direction whereas second array of write heads comprise a set of write heads 226 arranged to define write channels in the opposite tape direction. Array of MR heads 229 comprise a set of MR heads 230 arranged to define read channels in both tape directions.

Figure 21:
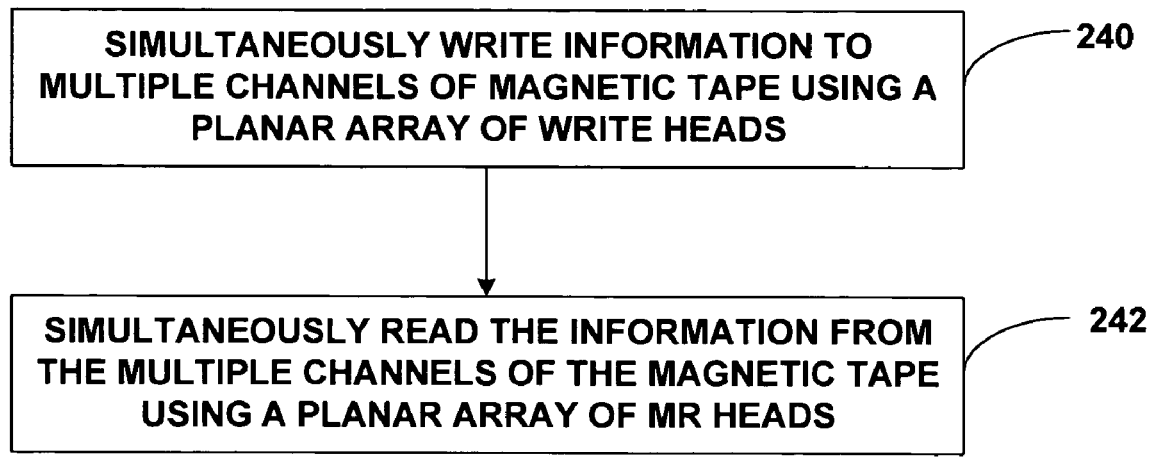
FIG. 21 is a flow diagram according to an embodiment of the invention.

FIG. 21 is a flow diagram according to an embodiment of the invention. As shown in FIG. 20, system 110 (FIGS. 12-14) simultaneously writes information to multiple channels of magnetic tape using planar array 112 of write heads (240). System 110 then simultaneously reads the information from the multiple channels of the magnetic tape using a planar array 114 of MR heads (242). In this manner, planar array 114 can serve as a verification mechanism to ensure the integrity of any data written by planar array 112. The "channels" defined on the magnetic tape may also be referred to as tracks. Generally, the term "channels" may refer to the various head channels of the system, or may alternatively refer to the tracks formed on the tape using the different heads of the system.

In another example, system 160 (FIG. 16) simultaneously writes information to multiple channels of magnetic tape regardless of the direction that the tape feeds relative to system 160. For example, if the tape moves left-to-right, then first array of write heads 162 of system 160 simultaneously writes information to multiple channels of magnetic tape and second array of MR heads 167 can read and verify the data written by the channels of first array of write heads 162. Alternatively, if the magnetic tape moves right-to-left, then second array of write heads 168 can be used simultaneously with first array of MR heads 161.

In another example, array of write heads 185 of system 180 (FIG. 17) simultaneously writes information to multiple channels of magnetic tape regardless of the direction that the tape feeds relative to system 180. In that case, first array of MR heads 181 simultaneously reads the information from the multiple channels of the magnetic tape when the tape feeds in a first direction (in this case right-to-left), and second array of MR heads 183 simultaneously reads the information from the multiple channels of the magnetic tape when the tape feeds in a second direction (in this case left-to-right). In this manner, bi-directional read/write operations can be performed, with array of write heads 185 performing the write operations for both directions, first array of MR heads 181 performing the read or verify operations for a first tape direction and second array of MR heads 183 performing the read or verify operations for a second tape direction.

In another example, first array of write heads 191 of system 190 (FIG. 18) simultaneously writes information to multiple channels of magnetic tape when the tape feeds in a first direction (in this case left-to-right), and second array of write heads 193 simultaneously writes information to multiple channels of magnetic tape when the tape feeds in a second direction (in this case right-to-left). Array of MR heads 195 simultaneously reads the information from the multiple channels of the magnetic tape regardless of whether the tape feeds in the first or second direction.

Various embodiments of the invention have been described. For example, a system for reading information stored on magnetic media has been described which utilizes a non-linear array of MR heads arranged in a two-dimensional matrix. Nevertheless various modifications may be made without departing from the sprit and scope of the invention.

Moreover, although many of the techniques have been described in the context of reading and writing data to data tracks, similar techniques may be used for writing or reading servo marks in servo tracks. Also, although many aspects of the invention have been described in the context of magnetic tape, other data storage media may also be used with the read/write systems described herein. The techniques may be useful for longitudinal magnetic media for which the magnetic orientation of individual magnetic domains is generally parallel to the surface of the medium, or perpendicular magnetic media for which magnetic anisotropy is perpendicular to the plane of the medium. These and other embodiments are within the scope of the following claims.

The invention claimed is:

1. A system for reading and writing information to a magnetic medium comprising:
    an array of write heads arranged in a two-dimensional matrix, wherein each of the write heads defines a write channel for the system along a length of the magnetic medium as the magnetic medium moves linearly relative to the array of write heads;
    an array of magnetoresistive (MR) heads arranged in a two-dimensional matrix, wherein each of the MR heads defines a read channel for the system along the length of the magnetic medium as the magnetic medium moves linearly relative to the array of MR heads; and
    an actuator coupled to the array of write heads and the array of MR heads to collectively move the array of write heads with the array of MR heads as the magnetic medium moves linearly relative to the array of write heads and the array of MR heads, wherein the array of write heads comprises first array of write heads, the system further comprising a second array of write heads arranged in a two-dimensional matrix, wherein each of the write heads of the first array defines a write channel for the system in a first direction and each of the write heads of the second array defines a write channel for the system in a second direction, and wherein the array of MR heads is positioned between first and second arrays of write heads.

2. The system of claim 1, wherein the array of MR heads comprises a planar array of MR heads and the array of write heads comprise a planar array of write heads.

3. The system of claim 1, wherein each of the write heads is substantially aligned with a corresponding one of the read heads such that each write channel substantially aligns with a corresponding read channel.

4. The system of claim 3, wherein the write channels are separated by less than 20 microns and the read channels are separated by less than 20 microns.

5. The system of claim 4, wherein the write channels are separated by less than 10 microns and the read channels are separated by less than 10 microns.

6. The system of claim 1, wherein the MR heads comprise giant magnetoresistive (GMR) heads.

7. The system of claim 1, wherein a number of write heads in the array of write heads is the same as a number of MR heads in the array of read heads.

8. The system of claim 1, wherein each of the write heads and each of the MR heads are independently controllable.

9. The system of claim 1, wherein each write head includes an excitation coil which coils in a direction perpendicular to a plane defined by the array of write heads.

10. A system for reading and writing information to a magnetic medium comprising:
an array of write heads arranged in a two-dimensional matrix, wherein each of the write heads defines a write channel for the system along a length of the magnetic medium as the magnetic medium moves linearly relative to the array of write heads;
an array of magnetoresistive (MR) heads arranged in a two-dimensional matrix, wherein each of the MR heads defines a read channel for the system along the length of the magnetic medium as the magnetic medium moves linearly relative to the array of MR heads;
a first actuator coupled to the array of write heads to move the array of write heads as the magnetic medium moves linearly relative to the array of write heads; and
a second actuator coupled to the array of MR heads to move the array of MR heads independently relative to the array of write heads as the magnetic medium moves linearly relative to the array of MR heads.

11. A system for reading and writing information to a magnetic medium comprising:
an array of write heads arranged in a two-dimensional matrix, wherein each of the write heads defines a write channel for the system along a length of the magnetic medium as the magnetic medium moves linearly relative to the array of write heads;
an array of magnetoresistive (MR) heads arranged in a two-dimensional matrix, wherein each of the MR heads defines a read channel for the system along the length of the magnetic medium as the magnetic medium moves linearly relative to the array of MR heads; and
an actuator coupled to the array of write heads and the array of MR heads to collectively move the array of write heads with the array of MR heads as the magnetic medium moves linearly relative to the array of write heads and the array of MR heads, wherein the array of MR heads comprises a first array of MR heads, the system further comprising a second array of MR heads arranged in a two-dimensional matrix, wherein each of the MR heads of the first array defines a read channel for the system in a first direction and each of the MR heads of the second array defines a read channel for the system in a second direction, and wherein the array of write heads is positioned between the first and second arrays of MR heads.

12. A system for reading and writing information to magnetic tape comprising:
a first array of write heads arranged in a two-dimensional matrix, wherein each of the write heads in the first array of write heads defines a write channel for the system in a first tape direction;
a first array of magnetoresistive (MR) heads arranged in a two-dimensional matrix, wherein each of the MR heads in the first array of MR heads defines a read channel for the system in a second tape direction;
a first actuator coupled to the first array of write heads and the first array of MR heads to collectively move the first array of write heads with the first array of MR heads;
a second array of write heads arranged in a two-dimensional matrix, wherein each of the write heads in the second array of write heads defines a write channel for the system in the second tape direction;
a second array of MR heads arranged in a two-dimensional matrix, wherein each of the MR heads in the second array of MR heads defines a read channel for the system in the first tape direction; and
a second actuator coupled to the second array of write heads and the second array of MR heads to collectively move the second array of write heads with the second array of MR heads.

13. The system of claim 12, wherein the write channels of the first and second arrays of write heads are separated by less than 10 microns and the read channels of the first and second arrays of MR heads are separated by less than 10 microns.

* * * * *